(12) United States Patent
Kobayashi et al.

(10) Patent No.: US 7,046,286 B1
(45) Date of Patent: May 16, 2006

(54) VIDEO CAMERA

(75) Inventors: Junji Kobayashi, Tokyo (JP); Hitoshi Narita, Yokohama (JP); Kyoji Tamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/211,268

(22) Filed: Dec. 14, 1998

(30) Foreign Application Priority Data

| Dec. 24, 1997 | (JP) | ................................. 9-354849 |
| Sep. 25, 1998 | (JP) | ............................... 10-271571 |
| Sep. 25, 1998 | (JP) | ............................... 10-271575 |
| Sep. 25, 1998 | (JP) | ............................... 10-271580 |

(51) Int. Cl.
*H04N 5/222* (2006.01)

(52) U.S. Cl. ................. 348/333.06; 348/373; 348/374; 348/376

(58) Field of Classification Search ........... 348/333.02, 348/333.06, 333.01, 333.11, 333.03, 373, 348/376, 333.05, 333.07, 375; 312/223.1; 396/373

See application file for complete search history.

(56) References Cited

U.S. PATENT DOCUMENTS

| 4,856,045 | A | * | 8/1989 | Hoshina ................... 348/14.01 |
| 4,928,300 | A | * | 5/1990 | Ogawa et al. ............ 348/14.01 |
| 5,559,554 | A | * | 9/1996 | Uekane et al. ......... 348/333.02 |
| 5,592,224 | A | * | 1/1997 | Shim ...................... 348/333.06 |
| 5,659,361 | A | * | 8/1997 | Jin .............................. 348/375 |
| 5,739,859 | A | * | 4/1998 | Hattori et al. ............... 348/375 |
| 5,790,193 | A | * | 8/1998 | Ohmori ....................... 348/375 |
| 5,886,735 | A | * | 3/1999 | Bullister .................. 348/14.16 |
| 5,960,156 | A | * | 9/1999 | Nishiyama et al. ......... 386/118 |
| 5,966,553 | A | * | 10/1999 | Nishitani et al. ........... 396/303 |
| 5,979,764 | A | * | 11/1999 | Swyst et al. .............. 235/462.2 |
| 5,982,429 | A | * | 11/1999 | Kamamoto et al. .... 348/333.06 |
| 6,009,336 | A | * | 12/1999 | Harris et al. ................. 455/566 |
| 6,067,116 | A | * | 5/2000 | Yamano et al. ............. 348/372 |
| 6,091,450 | A | * | 7/2000 | Hirasawa ............... 348/333.01 |
| D429,267 | S | * | 8/2000 | Sumita et al. ............. D16/202 |
| 6,115,069 | A | * | 9/2000 | Kuroki et al. ............... 348/375 |
| 6,169,854 | B1 | * | 1/2001 | Hasegawa et al. ........... 396/56 |
| 6,181,381 | B1 | * | 1/2001 | Evans .................... 348/333.01 |

(Continued)

FOREIGN PATENT DOCUMENTS

JP 06-169418 6/1994

(Continued)

*Primary Examiner*—David Ometz
*Assistant Examiner*—Yogesh Aggarwal
(74) *Attorney, Agent, or Firm*—Cowan, Liebowitz & Latman, P.C.

(57) ABSTRACT

In disposing a display part, such as an LCD panel, on a side face of the body of a compact video camera of a rectangular parallelepiped shape extending longer in the direction of height for use as a viewfinder as well as for a reproduction display, an attempt to minimize the whole size of the video camera for improvement in portability severely limits the size of a major side of the display part, preventing the display image plane from having an easily viewable size. To solve this problem, an intermediate connection part disposed between the video camera body and the display part is arranged to enable the display part to rotate in opening and closing directions with respect to the video camera body and also to rotate in directions included in a plane at which the display part is connected to the video camera body. Further, the axis of rotation of the intermediate connection part with respect to the video camera body is arranged to deviate a predetermined distance from the center line of a minor side of the display part.

35 Claims, 28 Drawing Sheets

U.S. PATENT DOCUMENTS

| | | | |
|---|---|---|---|
| 6,226,448 B1 * | 5/2001 | Takagi et al. | 386/118 |
| 6,483,542 B1 * | 11/2002 | Morinaga | 348/333.06 |
| 2001/0004269 A1 * | 6/2001 | Shibata et al. | 348/333.06 |
| 2004/0174452 A1 * | 9/2004 | Kinemura et al. | 348/333.06 |
| 2005/0078211 A1 * | 4/2005 | Whitehorn et al. | 348/376 |

FOREIGN PATENT DOCUMENTS

| | | |
|---|---|---|
| JP | 06-217174 | 8/1994 |
| JP | 07-030789 | 1/1995 |
| JP | 07-336571 | 12/1995 |
| JP | 08-009204 | 1/1996 |
| JP | 08-023466 | 1/1996 |
| JP | 09-009108 | 1/1997 |
| JP | 09-037124 | 2/1997 |
| JP | 09-163189 | 6/1997 |
| JP | 09-163199 | 6/1997 |
| JP | 10-164401 | 6/1998 |
| JP | 11-088735 | 3/1999 |
| WO | WO9846022 | 10/1998 |
| WO | WO 9846022 A1 * | 10/1998 |

* cited by examiner

LENS PART 301

DISPLAY PART 307

DISPLAY PART 307

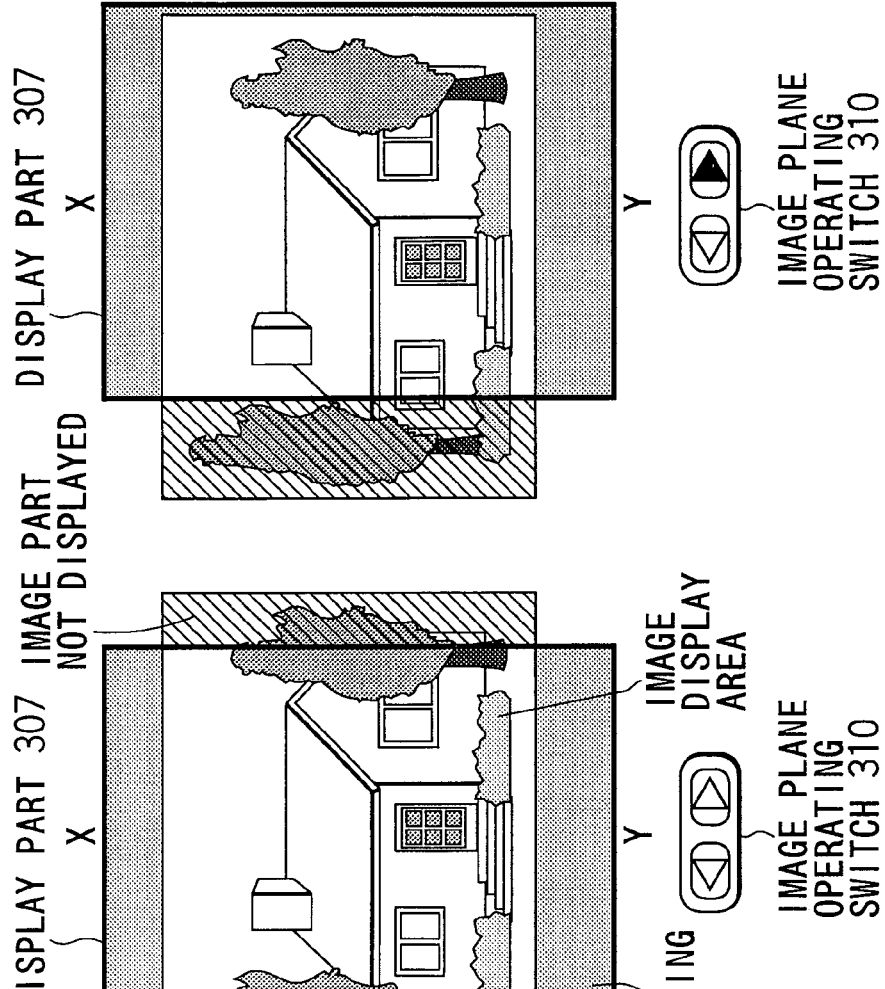

FIG. 23(a)
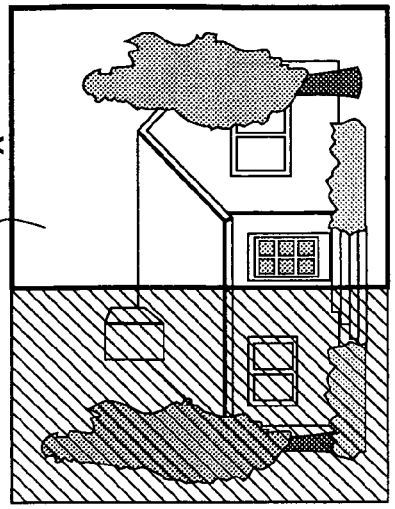
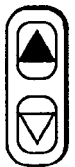
FIG. 23(b)
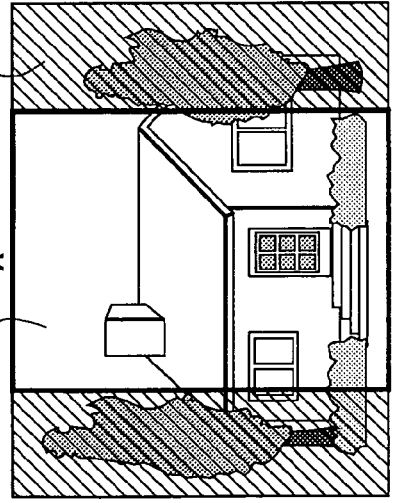
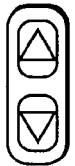
FIG. 23(c)
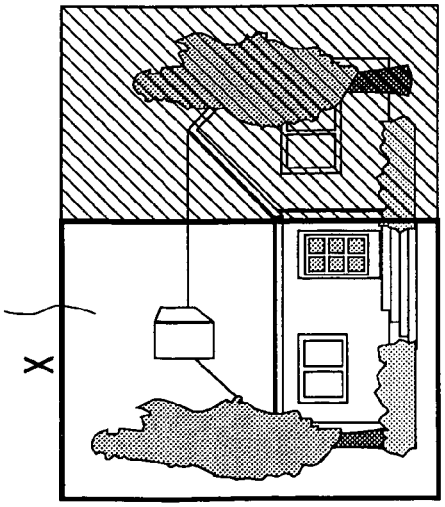
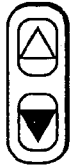

IMAGE PICKUP MODE

IMAGE REPRODUCING MODE

IMAGE PICKUP MODE

IMAGE REPRODUCING MODE

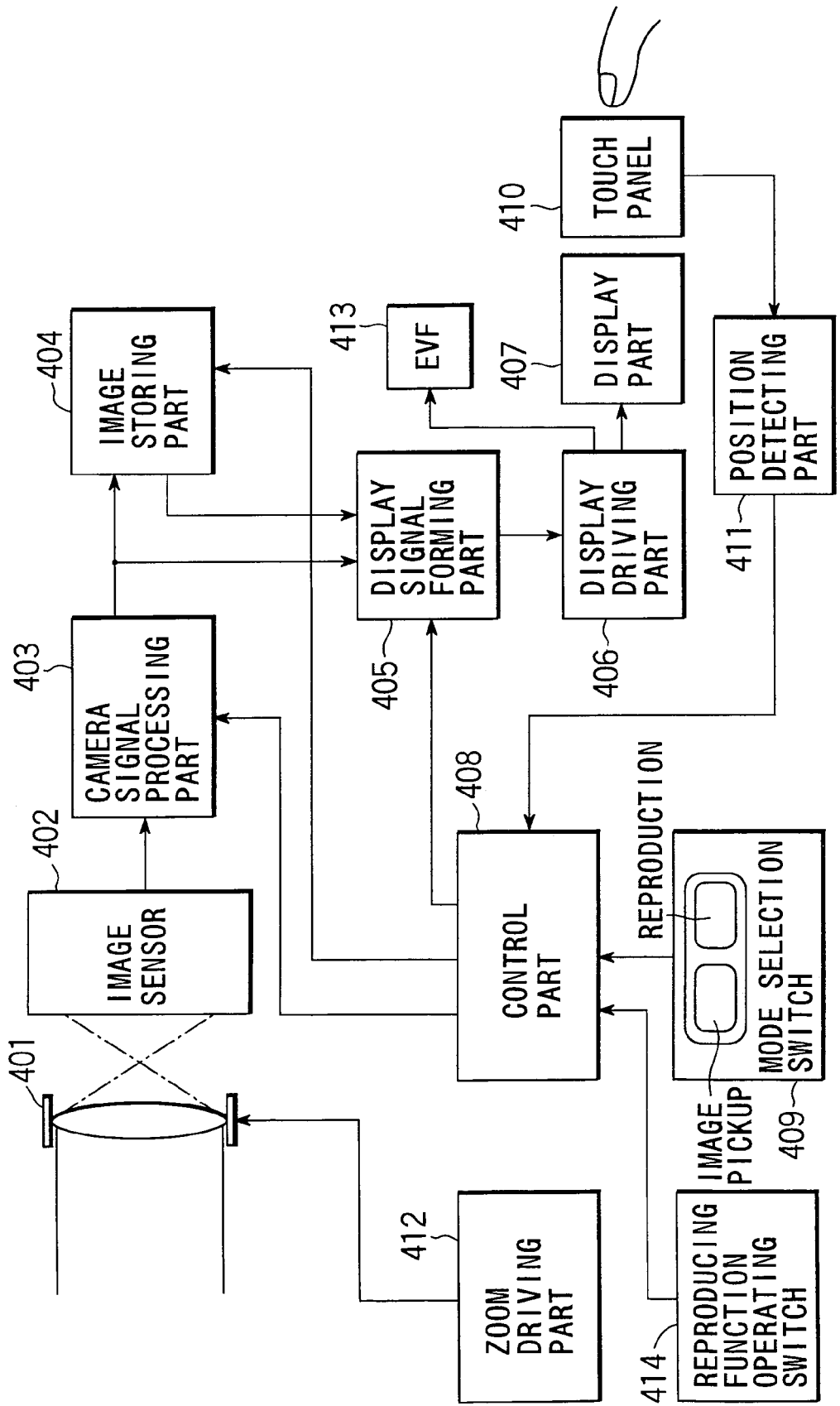

IMAGE REPRODUCING MODE

IMAGE PICKUP MODE

VIDEO CAMERA

BACKGROUND OF THE INVENTION

1. Field of the Invention

The present invention relates to a video camera having a display part such as an LCD or the like arranged to display a picked-up image such as a still image or a motion image.

2. Description of Related Art

Some of video cameras have heretofore been provided with display parts such as liquid crystal displays (LCDs) or the like which are arranged as shown in FIG. 8 for the purpose of viewing a picked-up image. Further, video cameras of the kind having their bodies formed in a rectangular parallelepiped shape extending longer in the direction of height have become popular, because this shape is easily graspable and operatable. FIG. 7 is a perspective view showing by way of example the appearance of a video camera having such a body shape.

As shown in FIG. 7, the video camera includes a video camera body 901, a display part 906 composed of an LCD, etc., having a display image plane 906*a*, and a lens part 914.

In the case of the video camera of the kind shown in FIG. 7, if an LCD panel is arranged to serve both as a viewfinder and for a reproduction display, the display part 906 is generally in a rectangular parallelepiped shape which extends laterally longer following the shape of a display image plane. Besides, the longitudinal direction of the display part 906 remains the same both at the time of reproduction display and in a stowed position. Therefore, in order to minimize the whole size of the video camera obtained with the display part 906 in its stowed position for improved portability, the length of the major side of the display part 906 is limited to the length of the minor side of the video camera body 901. This limitation has presented a problem, because it hinders a desire to make the image plane 906*a* better viewable by increasing the size of the display part 906.

BRIEF SUMMARY OF THE INVENTION

The invention is directed to the solution of the problem of the prior art described above. It is, therefore, an object of the invention to provide a video camera which is capable of solving the problem.

To attain the above object, in accordance with an aspect of the invention, there is provided a video camera having an approximately rectangular parallelepiped shape extending longer in a height direction of a body thereof in an image pickup state, which comprises a display part of an approximately rectangular shape disposed on a side face of the video camera body to display a picked-up image, and a moving member for enabling the display part to move between a first position in which the display part makes the picked-up image viewable and a second position in which the display part is stowed in the video camera body, wherein, when the display part is in the second position, a major-side direction of the display part coincides with a major-side direction of the video camera body.

In accordance with another aspect of the invention, there is provided a video camera having an approximately rectangular parallelepiped shape extending longer in a height direction of a body thereof in an image pickup state, which comprises a display part of an approximately rectangular shape disposed on a side face of the video camera body to display a picked-up image, a first member for enabling the display part to rotate around a first shaft approximately parallel with an incident optical axis from a state where a major-side direction of the display part is situated approximately parallel with a major-side direction of the video camera body, and a second member for enabling the display part to rotate around a second shaft perpendicular to the incident optical axis in such a state that the display part has rotated approximately 90 degrees from the state where the major-side direction of the display part is situated approximately parallel with the major-side direction of the video camera body.

In accordance with a further aspect of the invention, there is provided a video camera having an approximately rectangular parallelepiped shape extending longer in a height direction of a body thereof in an image pickup state, which comprises display means having a display image plane of an approximately rectangular shape and disposed such that a major-side direction of the display image plane coincides with a major-side direction of the video camera body, and display control means having a first mode of causing the display means to display an image with the major-side direction of the display image plane of the display means put on a horizontal plane and a second mode of causing the display means to display an image with a minor-side direction of the display image plane of the display means put on a horizontal plane.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 22(a) shows one example of display made on a display image plane of a display part in the image pickup mode in the fourth embodiment.

FIG. 22(b) shows one example of display made on the display image plane of the display part in the image pickup mode in the fourth embodiment.

FIG. 22(c) shows one example of display made on the display image plane of the display part in the image pickup mode in the fourth embodiment.

FIG. 23(a) shows one example of display made on the display image plane of the display part in the image pickup mode in the fourth embodiment.

FIG. 23(b) shows one example of display made on the display image plane of the display part in the image pickup mode in the fourth embodiment.

FIG. 23(c) shows one example of display made on the display image plane of the display part in the image pickup mode in the fourth embodiment.

FIG. 28 is a block diagram showing by way of example the arrangement of the video camera according to the fifth embodiment.

DETAILED DESCRIPTION OF THE INVENTION

Hereinafter, preferred embodiments of the invention will be described in detail with reference to the drawings.

Figure 1:
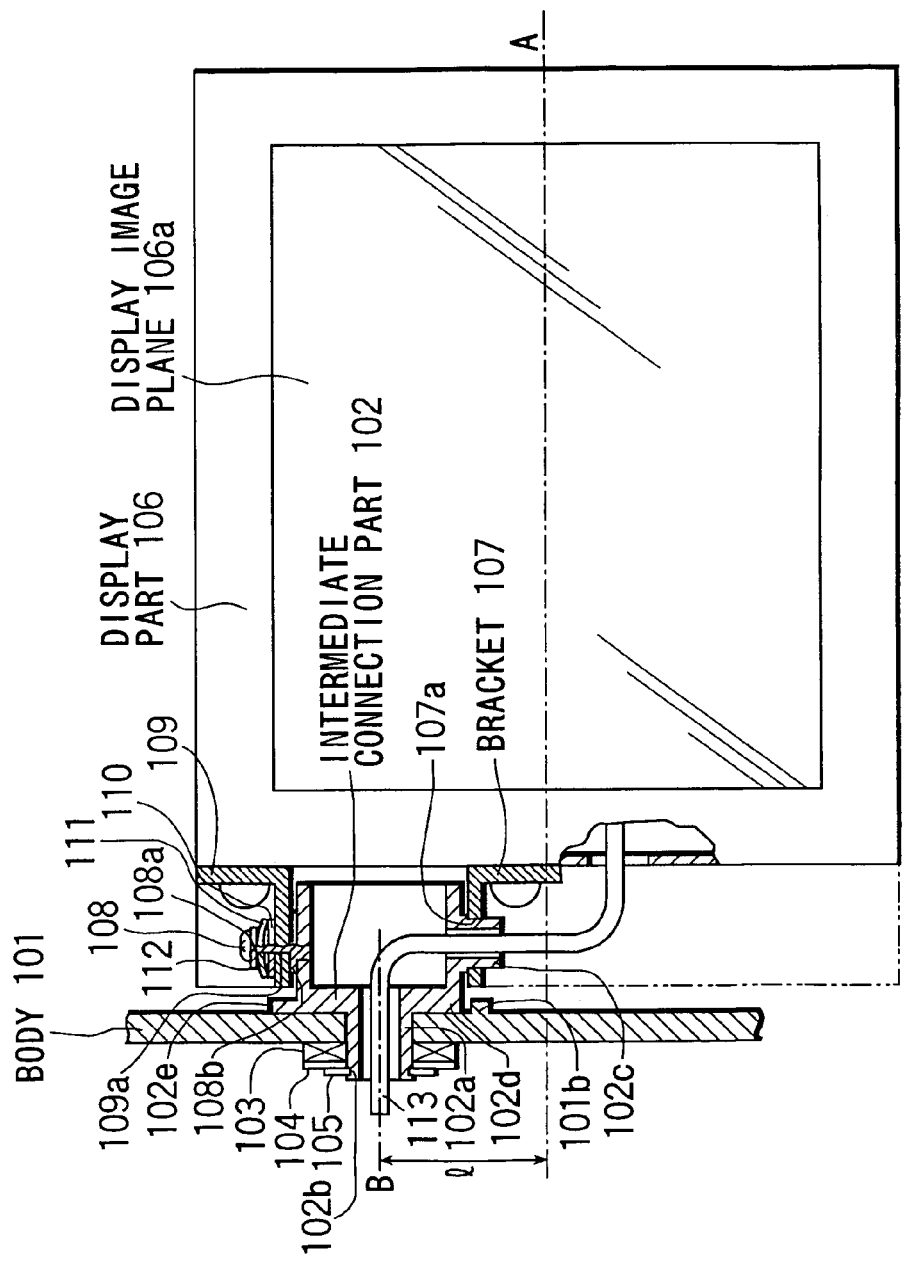
FIG. 1 is a partly sectional view showing the arrangement of essential parts of a video camera according to a first embodiment of the invention.

FIG. 1 is a partly sectional view showing in outline the essential parts of a video camera according to a first embodiment of the invention. In FIG. 1, reference numeral 101 denotes a video camera body. An intermediate connection part 102 has a cylindrical part 102a rotatably fitted in a hole provided in the video camera body 101. The intermediate connection part 102 pierces through a washer 103 and a belleville (spring) washer 104 and has a retaining ring 105 secured to a groove part 102b in a state of compressing the belleville washer 104. The body 101, the intermediate connection part 102 and the washer 103 respectively have their abutting faces smoothly formed to be slidable relative to each other.

A display part 106 has a display image plane 106a on its front side. A first bracket 107 is secured with a screw to a side face of the display part 106 and has a hole part 107a rotatably fitted on a second cylindrical part 102c of the intermediate connection part 102.

An opening-and-closing shaft 108 is secured by caulking to the intermediate connection part 102. A second bracket 109 is also secured with a screw to the same side face of the display part 106. The shaft 108 is rotatably fitted in a hole part 109a provided in the second bracket 109 and extends through a small washer 110 and a small belleville washer 111 to have a small retaining ring 112 secured to its groove part 108a in a state of compressing the small belleville washer 111.

A flange part 108b of the opening-and-closing shaft 108, the second bracket 109 and the small washer 110 respectively have their abutting faces smoothly finished to be slidable relative to each other. A wiring cable 113 which is torsional is arranged to connect a circuit disposed within the display part 106 to the inside of the video camera body 101 through the cylindrical parts 102a and 102c of the intermediate connection part 102. The intermediate connection part 112 has a projection 102e formed on its periphery. When the intermediate connection part 112 rotates on the cylindrical part 102a, the projection 102e comes to abut on a projection 101b of the body 101.

Figure 2:
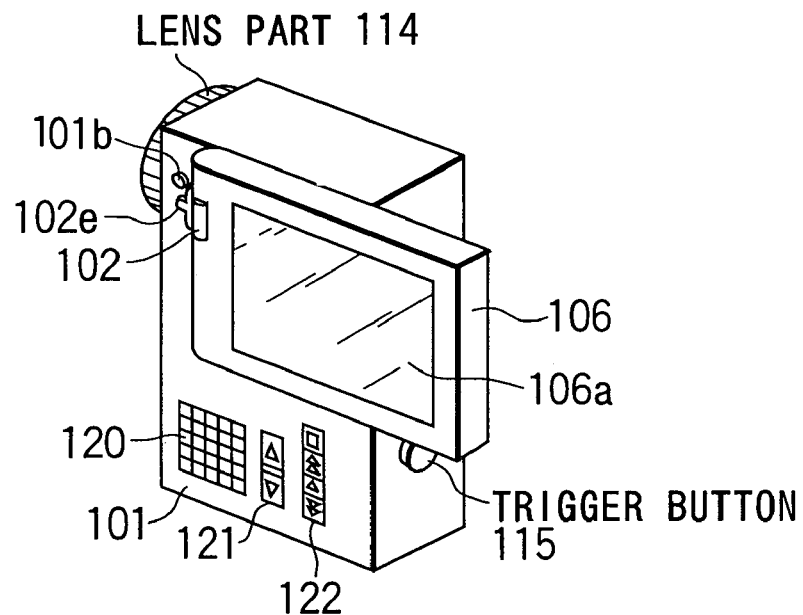
FIG. 2 is a perspective view showing the shape of the video camera according to the first embodiment obtained when the video camera is operated for reproduction of an image.

FIG. 2 is a perspective view showing the state of the video camera obtained in the image reproducing mode. The video camera includes a lens part 114 and a trigger button 115. A speaker 120 to output sounds when images are reproduced, a volume adjustment part 121 provided for adjustment of the volume of sounds, an operation switch part 122 provided for reproduction of images, frame feeding, frame returning, stopping of a tape, etc., are disposed in a lower part of one side face of the body 101 to which the display part 106 is connected. This arrangement is such that, at the time of image reproduction, the display part 106 is never caused to be in a position overlapping the speaker 120, the volume adjustment part 121, the operation switch part 122 to make sounds from the speaker 120 adequately audible and to ensure good operability of the video camera.

With the video camera arranged as the first embodiment of the invention in the manner described above, when one end of the display part 106 shown in FIG. 2 is pulled upward from the body 101, the second bracket 109 rotates on the opening-and-closing shaft 108 with respect to the intermediate connection part 102 against a frictional braking force developed between the flange part 108b of the opening-and-closing shaft 108 and the small washer 110 by the pressure exerted by the small belleville washer 111. When the display part 106 ceases to be pulled up at the position of the front shooting state in which the operator faces the front side of the video camera, as shown in FIG. 3, the front shooting can be accomplished as shown in FIG. 3 with the display part 106 held in a half fixed state by virtue of the above-stated frictional braking force.

Figure 4:
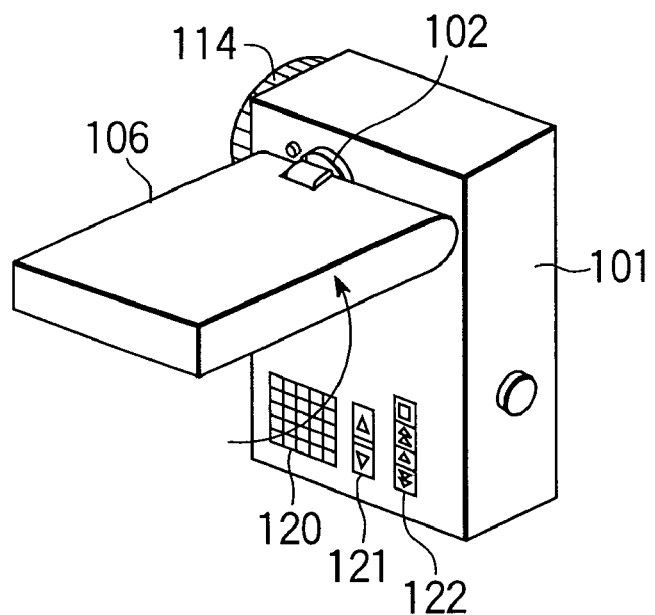
FIG. 4 is a perspective view showing the shape of the video camera according to the first embodiment obtained when the video camera is operated for shooting at a high angle.

Next, when either a clockwise or counterclockwise force is applied to the display part 106 as shown in FIG. 4, the intermediate connection part 102 rotates around the cylindrical part 102a with respect to the video camera body 101 against the frictional braking force developed between the flange part 102d and the washer 103 by the pressure of the belleville washer 104. Then, when the rotation of the intermediate connection part 102 is brought to a stop at the position of the high-angle shooting state as shown in FIG. 4, the high-angle shooting can be accomplished with the display part 106 held in a half fixed state by the above-stated frictional braking force.

Figure 3:
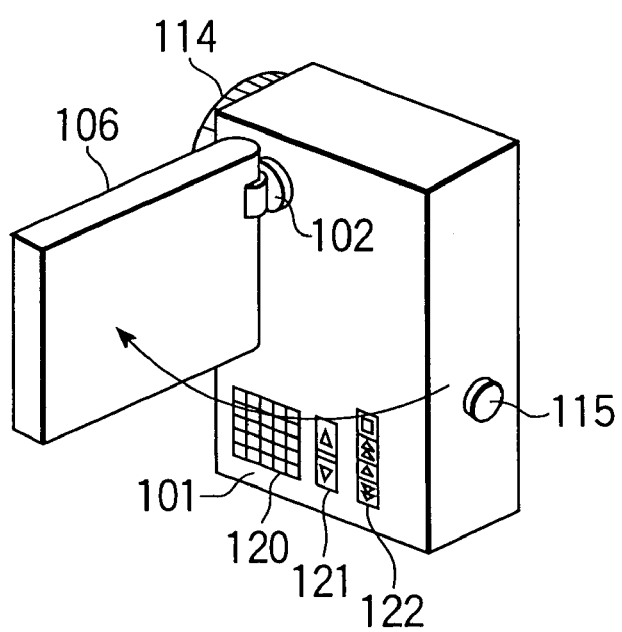
FIG. 3 is a perspective view showing the shape of the video camera according to the first embodiment obtained when the video camera is operated for shooting with the operator facing the front side of the video camera.
Figure 5:
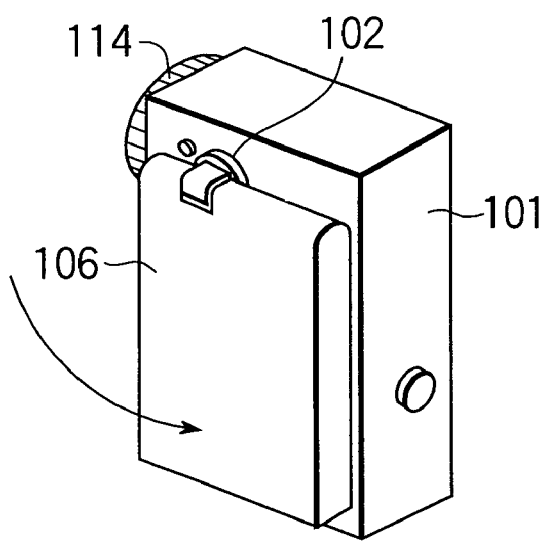
FIG. 5 is a perspective view showing the shape of the video camera according to the first embodiment obtained when the video camera is set in a stowed position.

With the video camera in the state as shown in FIG. 4, when the display part 106 is pushed downward, the second bracket 109 shown in FIG. 1 rotates around the opening-and-closing shaft 108 like in the case of the shift from the state of FIG. 2 to the state of FIG. 3. Then, one side face of the display part 106 on which the display image plane 106a is located comes to abut on the video camera body 101 and the swing of the display part 106 comes to a stop to bring about a stowed state in which the display part 106 is stowed in the video camera body 101 as shown in FIG. 5. When the display part 106 is in the stowed state, the speaker 120, the volume adjustment part 121 and the operation switch part 122 are covered with the display part 106 to be protected from various contaminants such as dust.

Figure 6:
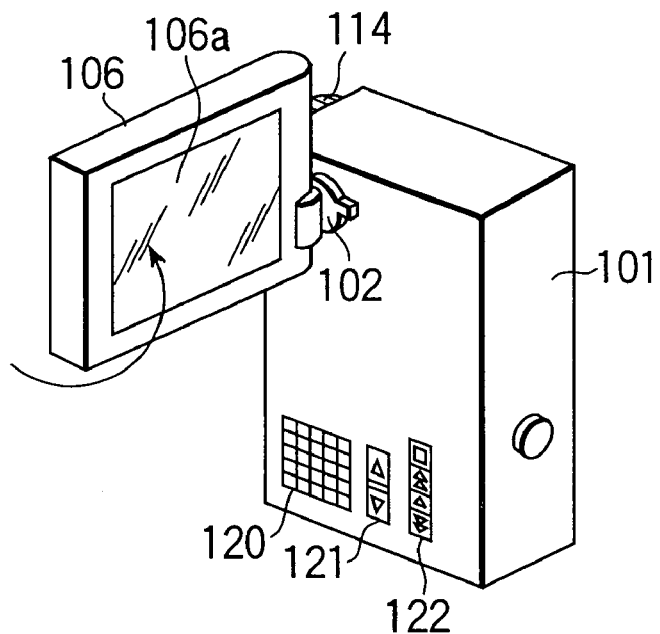
FIG. 6 is a perspective view showing the shape of the video camera according to the first embodiment obtained when the video camera is operated for ordinary shooting.
Figure 7:
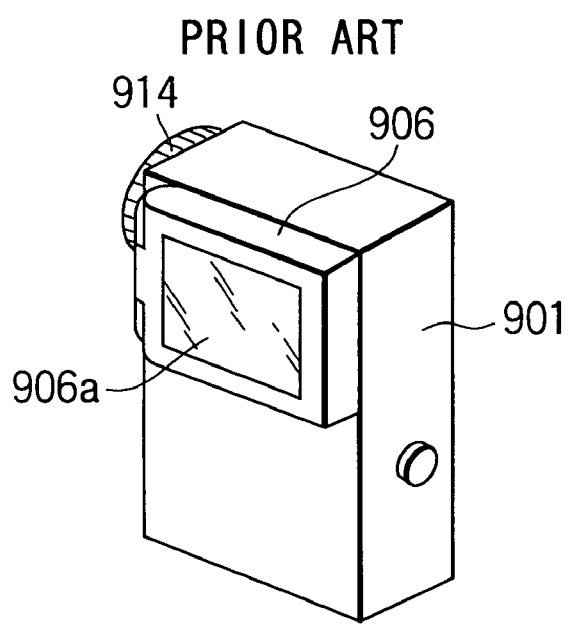
FIG. 7 shows by way of example the appearance of a conventional compact video camera.
Figure 8:
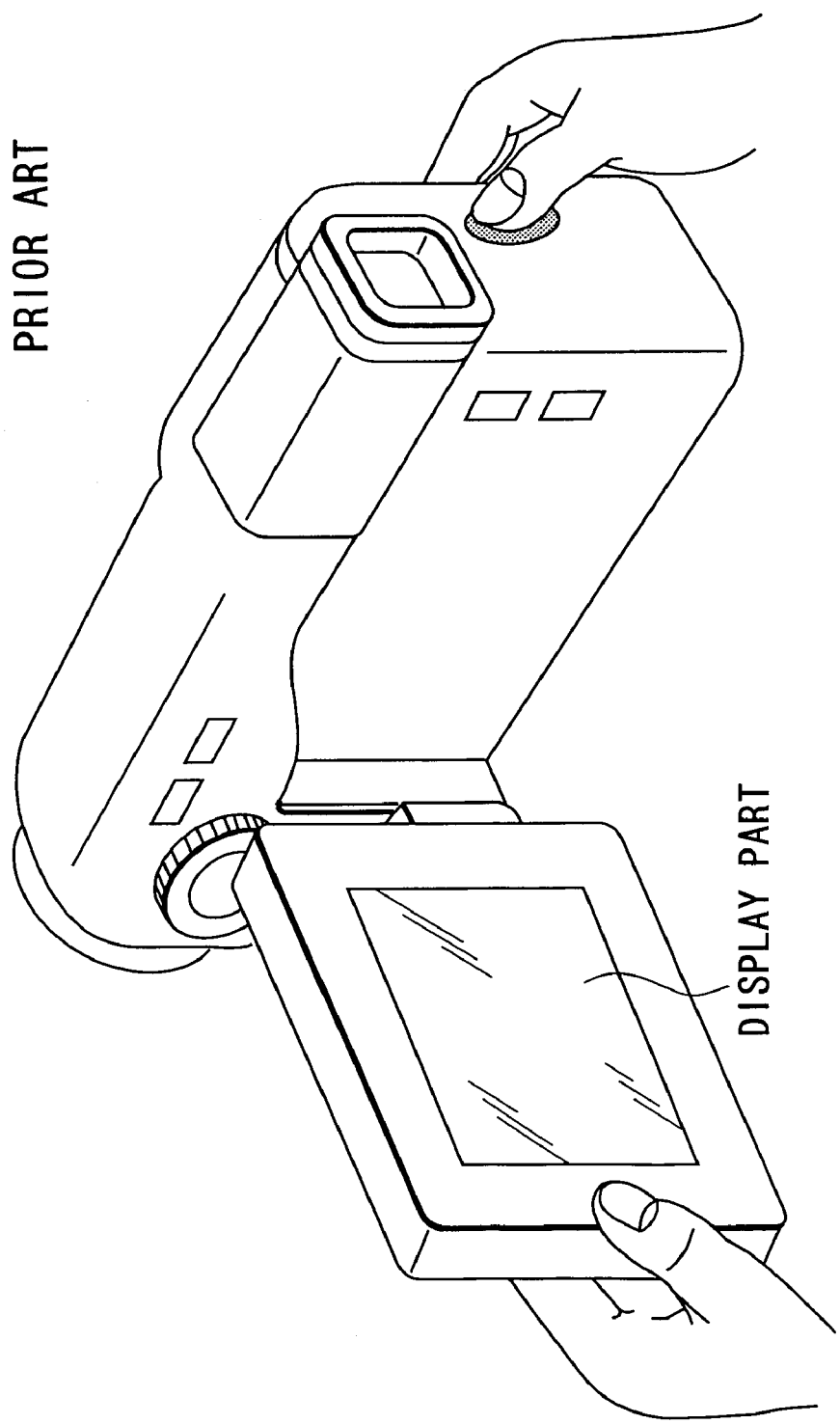
FIG. 8 shows by way of example the arrangement of a conventional video camera.

Further, in the state of FIG. 4, if the display part 106 is rotated about 90 degrees around the cylindrical part 102a of the intermediate connection part 102 in the direction of the arrow, there is obtained a normal shooting state as shown in FIG. 6. After that, the video camera can also be set into a low-angle shooting state (not shown) by rotating the display part 106 further about 90 degrees.

Then, if the display part 106 is rotated still further from the low-angle shooting posture, the projection 102e of the intermediate connection part 102 comes to abut on the projection 101b of the body 101 to prevent the video camera from coming into the state shown in FIG. 3.

Referring again to FIG. 1, the axis B of rotation of the intermediate connection part 102 with respect to the video camera body 101 deviates as much as a distance Q from a center line A of the width of the mounting side of the display part 106. By virtue of this deviation, the display part 106 in the stowed position never protrudes from the body 101 even in a case where the intermediate connection part 102 is disposed in the neighborhood of an angular part of the mounting side of the video camera body 101. Further, when the display part 106 is in such a posture as shown in FIG. 2 relative to the video camera body 101, the display part 106 never protrudes from the upper portion of the video camera body 101, so that the center of gravity of the video camera is situated in the center or thereabout of the video camera body 101, thereby facilitating the holding of the video camera.

In FIG. 1, a two-dot-chain line represents a cover provided for the intermediate connection part 102 of the display part 106.

As mentioned above and as shown in FIG. 5, the display part can be stowed without causing any part left protruding from the outside shape of the video camera to ensure its compactness. In addition to this advantage, the video camera is arranged to permit viewing the display image plane 106a of the display part 106 in a large, clearly viewable size in reproducing images as shown in FIG. 2.

Further, the extent of protrusion of the display part 106, at the time of image reproduction, can be lessened to make the outside shape of the video camera smaller and to improve the balance of weight distribution of the video camera.

Figure 9:
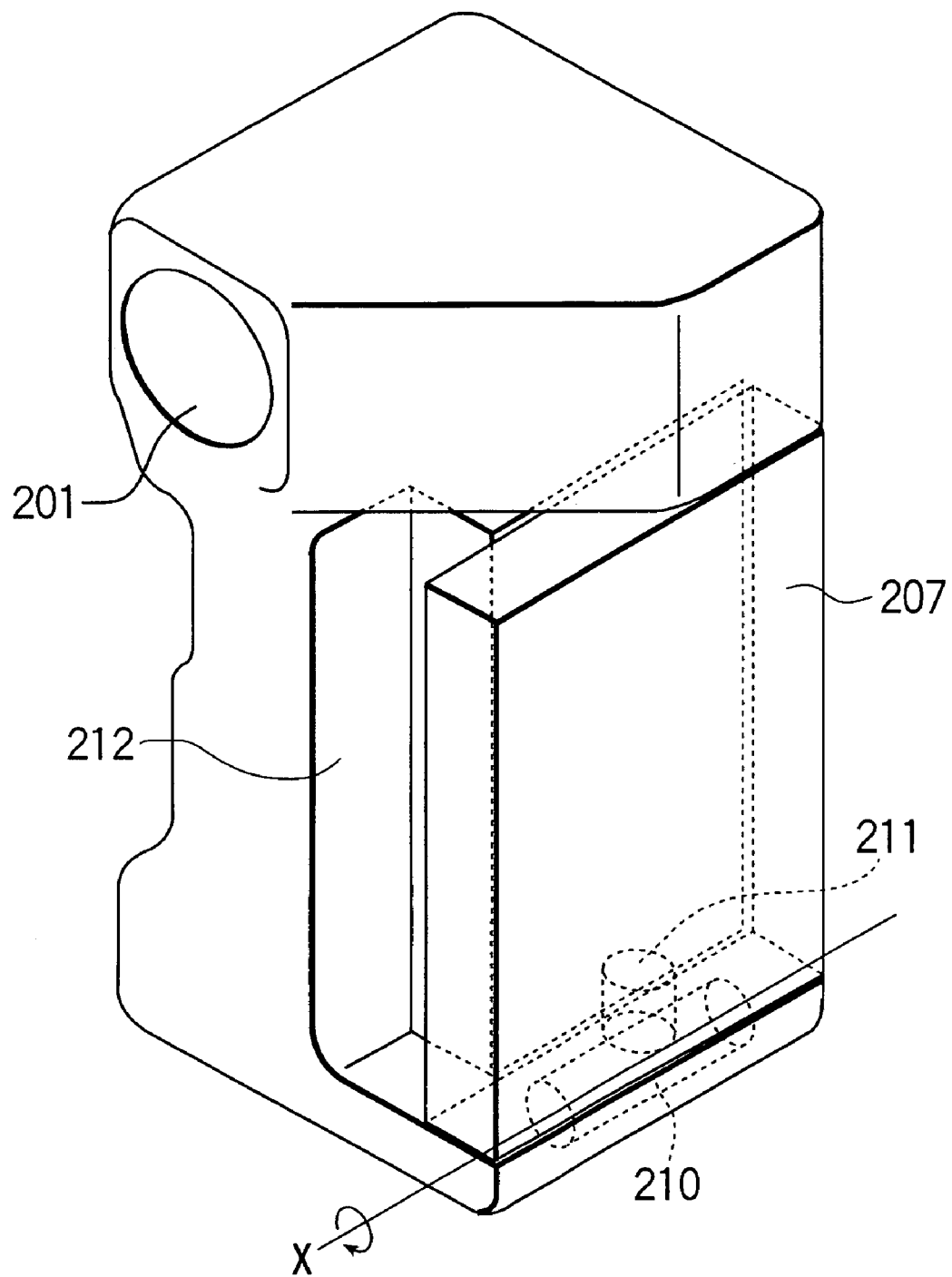
FIG. 9 is a perspective view showing a video camera according to a second embodiment of the invention in a state of having a display part stowed in a body of the video camera.
Figure 10:
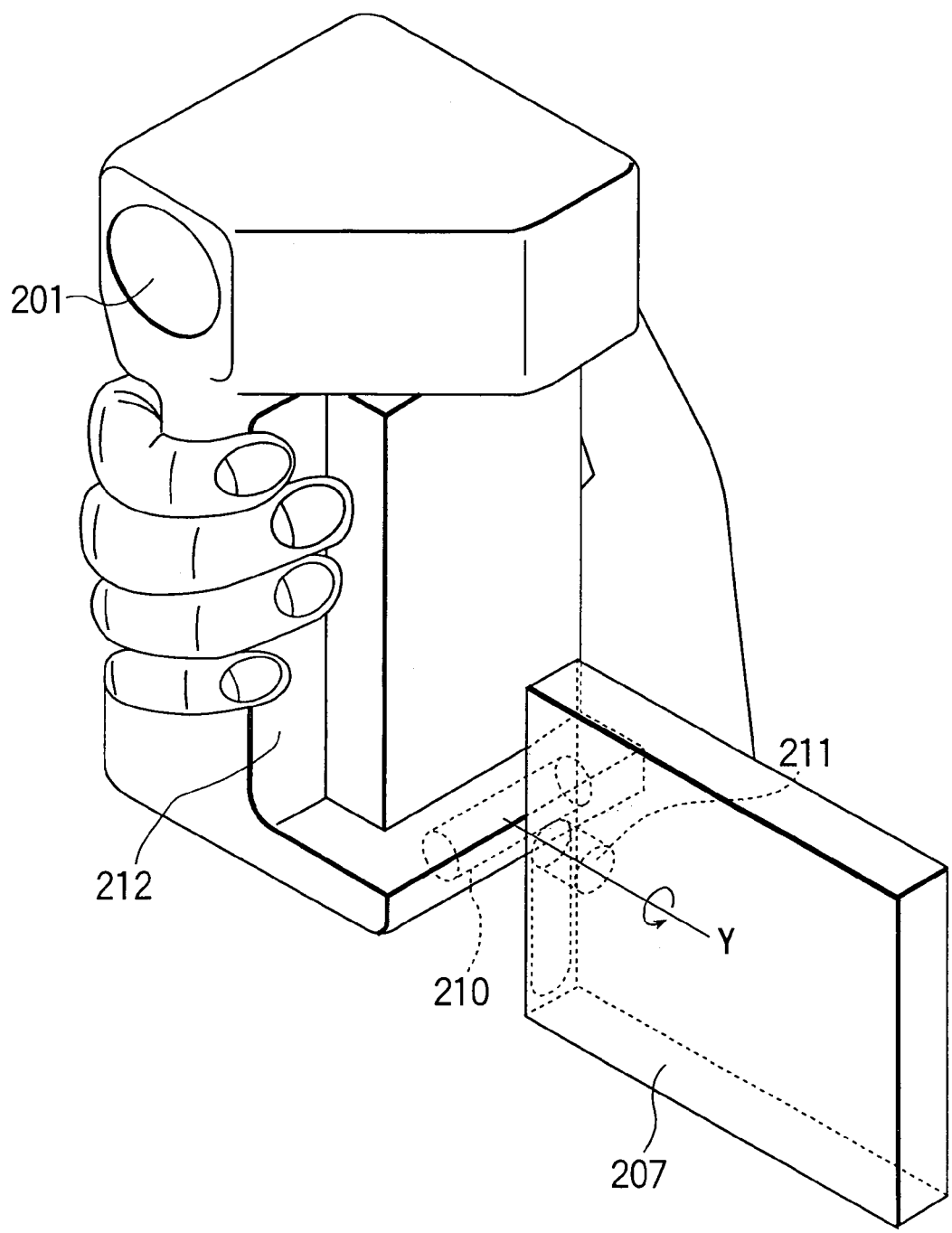
FIG. 10 is a perspective view showing the video camera according to the second embodiment in a state of having the display part being used.
Figure 11:
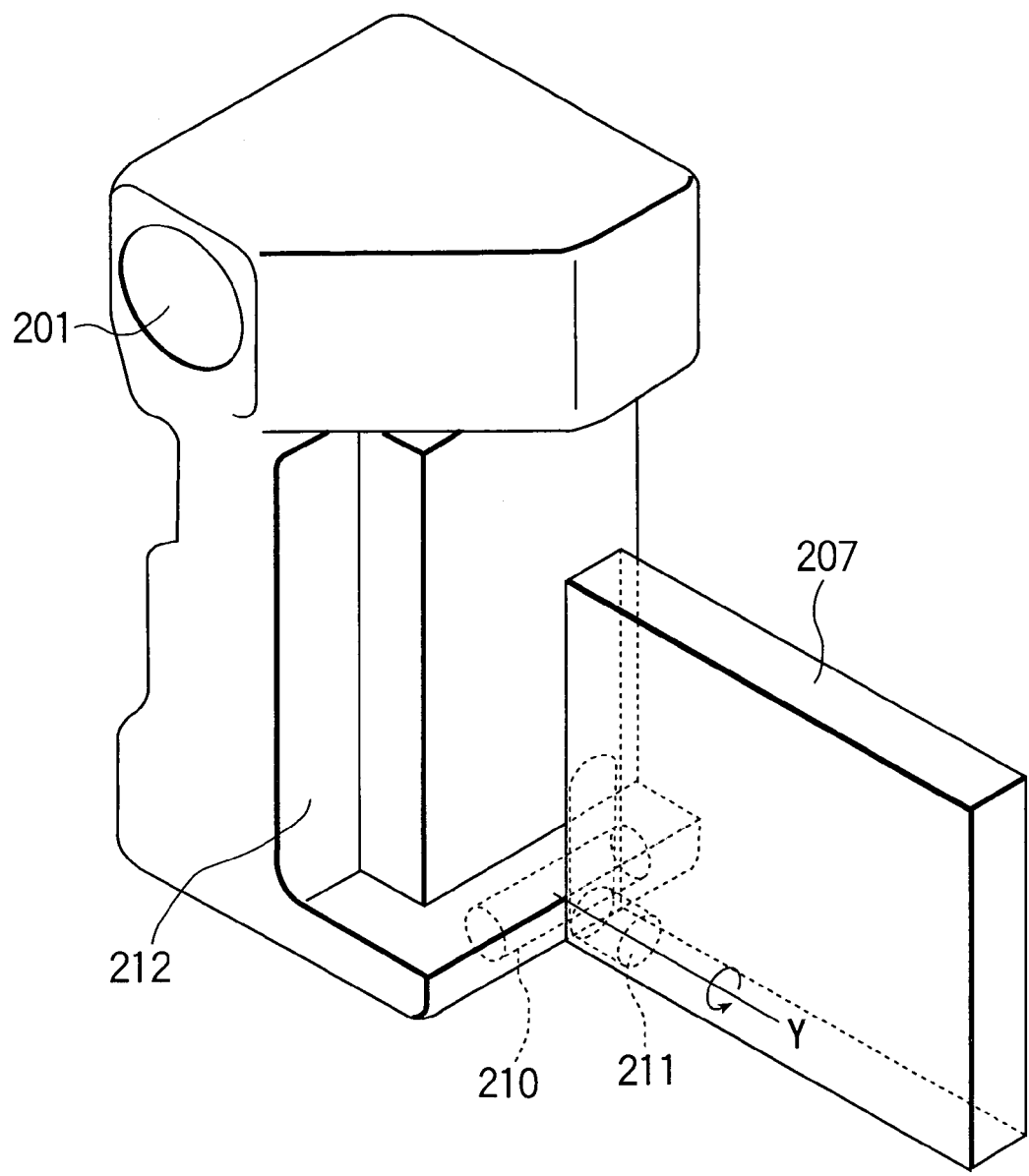
FIG. 11 is a perspective view showing the video camera according to the second embodiment in another state of having the display part being used.

FIG. 9 is a perspective view showing a video camera according to a second embodiment of the invention. In FIG. 9, the video camera is shown in a state of having a display part 207 which has a display image plane, such as an LCD, in its stowed position. FIGS. 10 and 11 show also in perspective views the display part 207 of the video camera in states of being used in different manners. As shown in FIGS. 9, 10 and 11, the video camera according to the second embodiment has an approximately rectangular parallelepiped shape extending longer in the direction of its height (in the direction perpendicular to the horizontal plane).

Figure 12:
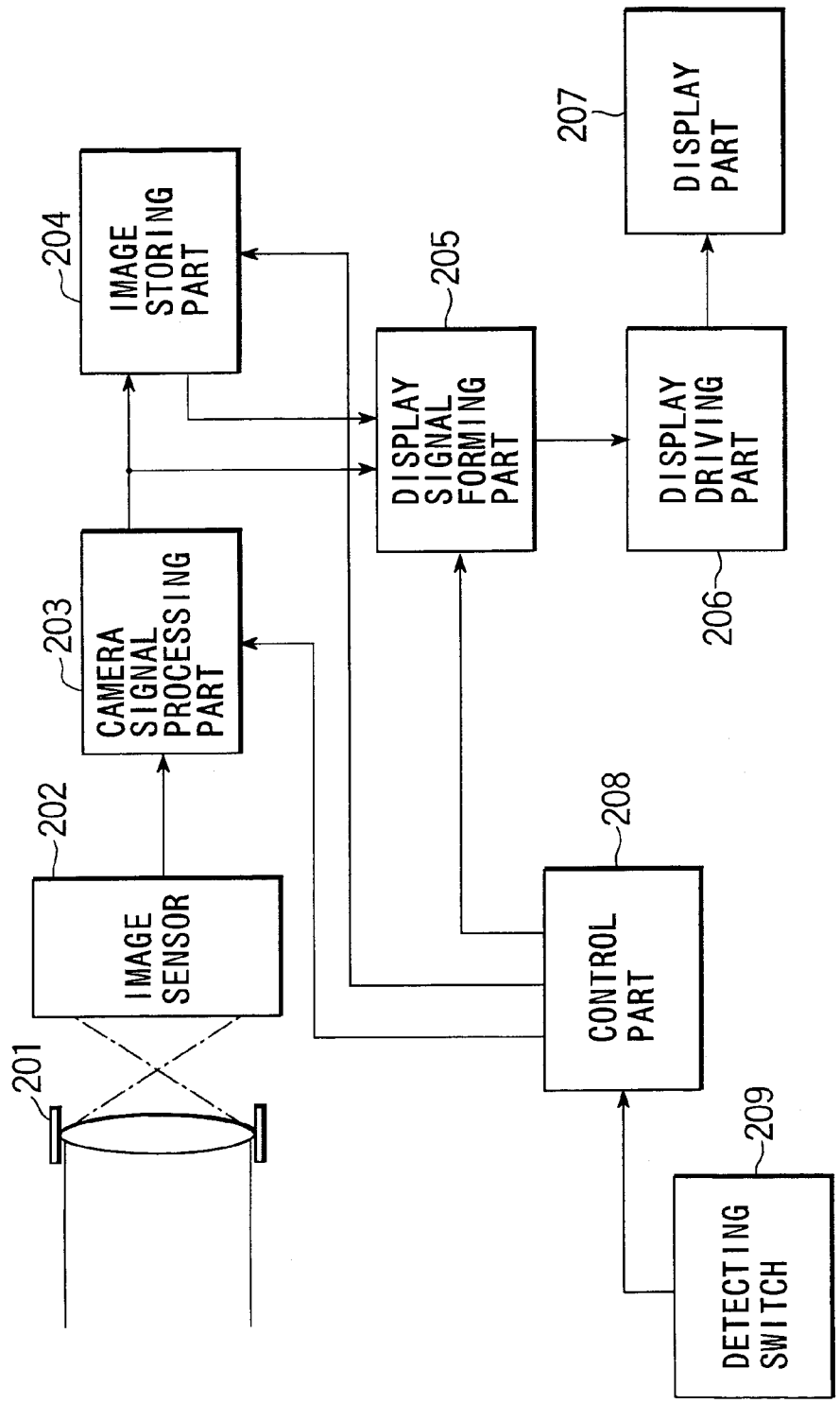
FIG. 12 is a block diagram showing by way of example the arrangement of the video camera according to the second embodiment.

FIG. 12 is a block diagram showing the arrangement of the video camera according to the second embodiment of the invention. Referring to FIG. 12, a lens part 201 is arranged to obtain an optical image of a shooting object. An image sensor 202 is arranged to photo-electrically convert the image of the shooting object coming from the lens part 201 into an electrical signal. A control part 208 is composed of a CPU, etc. and is arranged to perform control over the whole video camera. A camera signal processing part 203 is arranged to form a luminance signal and color-difference signals by matrix-processing the signal coming from the image sensor 202 and to carry out, on these signals, such processing actions that include a gamma correction process, A/D conversion, etc.

An image storing part 204 is composed of a magnetic tape or a semiconductor memory and is arranged to store the signals processed by the camera signal processing part 203. The display part 207 has a display image plane of an approximately rectangular shape which is composed an LCD, etc., as mentioned above. The display part 207 is arranged to display an image picked up by the image sensor 202 or an image stored by the image storing part 204. A display signal forming part 205 is arranged to form a signal for displaying on the display part 207 by converting, in accordance with a predetermined format, the signal obtained from the camera signal processing part 203 or the image storing part 204. A display driving part 206 is arranged to drive and cause the display part 207 to display thereon an image based on the signal formed by the display signal forming part 205.

Figure 15:
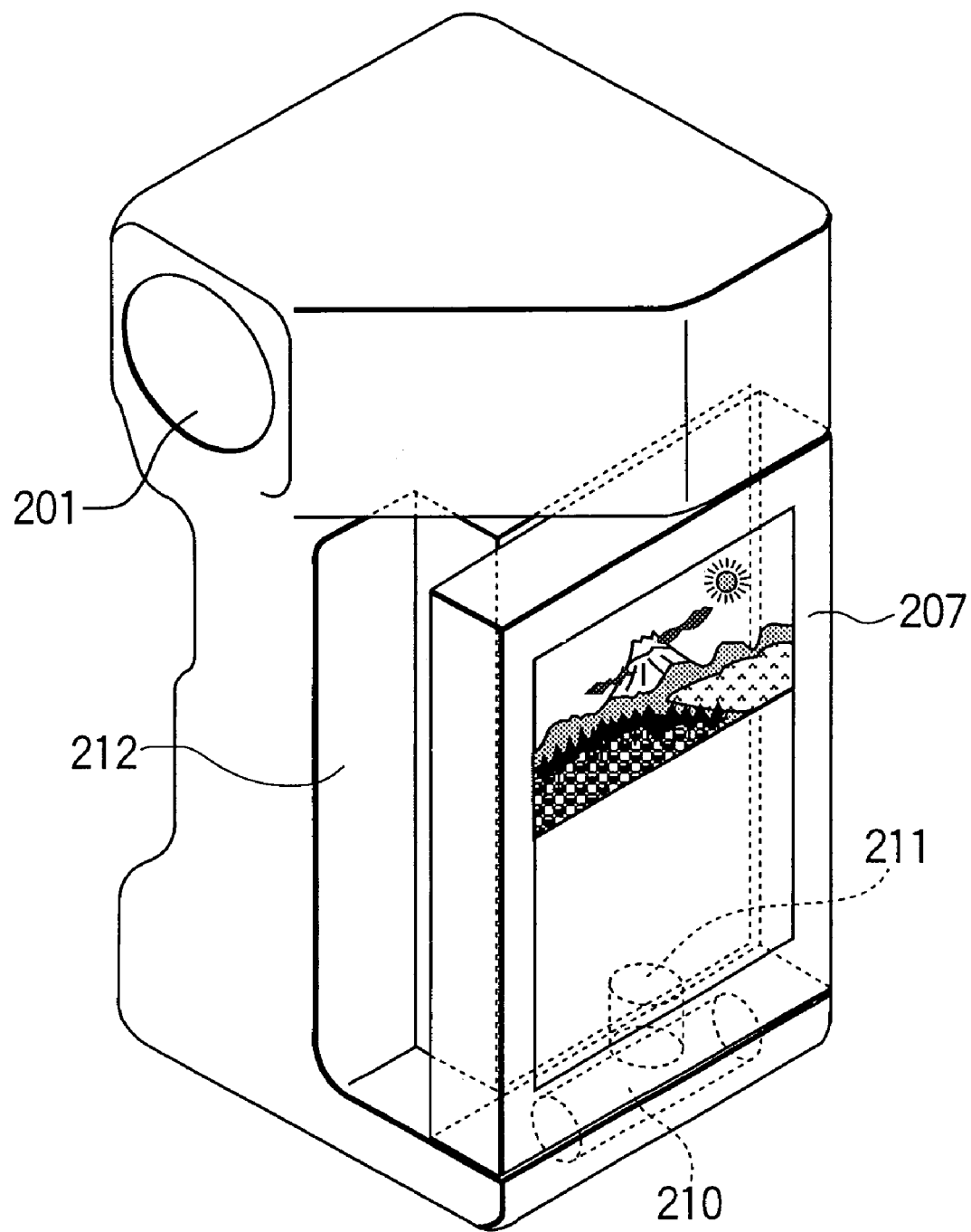
FIG. 15 is a perspective view showing the video camera according to the second embodiment in a further state of having the display part being used.

A detecting switch 209 is provided for finding whether or not the display part 207 is in a state shown in FIG. 15 and is arranged to detect an angle of rotation of the display part 207 obtained by a hinge part 210 and another hinge part 211.

Referring to FIGS. 9 to 11, the hinge part 210 is arranged to allow the display part 207 to rotate on an axis X which is approximately parallel with an incident optical axis of the lens part 201. When the display part 207 is rotated about 90 degrees on the axis X from the state shown in FIG. 9, the posture of the display part 207 becomes as shown in FIG. 10. In the state shown in FIG. 10, the hinge part 211 allows the display part 207 to rotate on an axis Y which is approximately perpendicular to the incident optical axis of the lens part 201 and also approximately perpendicular to the axis X. Further, when the display part 207 is vertically slid from the position shown in FIG. 10, the display part 207 comes to take a position as shown in FIG. 11. In the state shown in FIG. 11, the video camera permits the operator thereof to stably carry on a shooting operation by grasping the video camera body 212 on one side thereof opposite to the side on which the display part 207 is located. Further, the display part 207 is arranged to be stowed in a state in which the longitudinal direction of the display image plane of the display part 207 becomes approximately parallel with the longitudinal direction of the video camera body 212. This arrangement permits the display part 207 to be arranged to have a large-sized display image plane.

The details of the hinge part 211 are next described below with reference to FIGS. 13 and 14.

Figure 13:
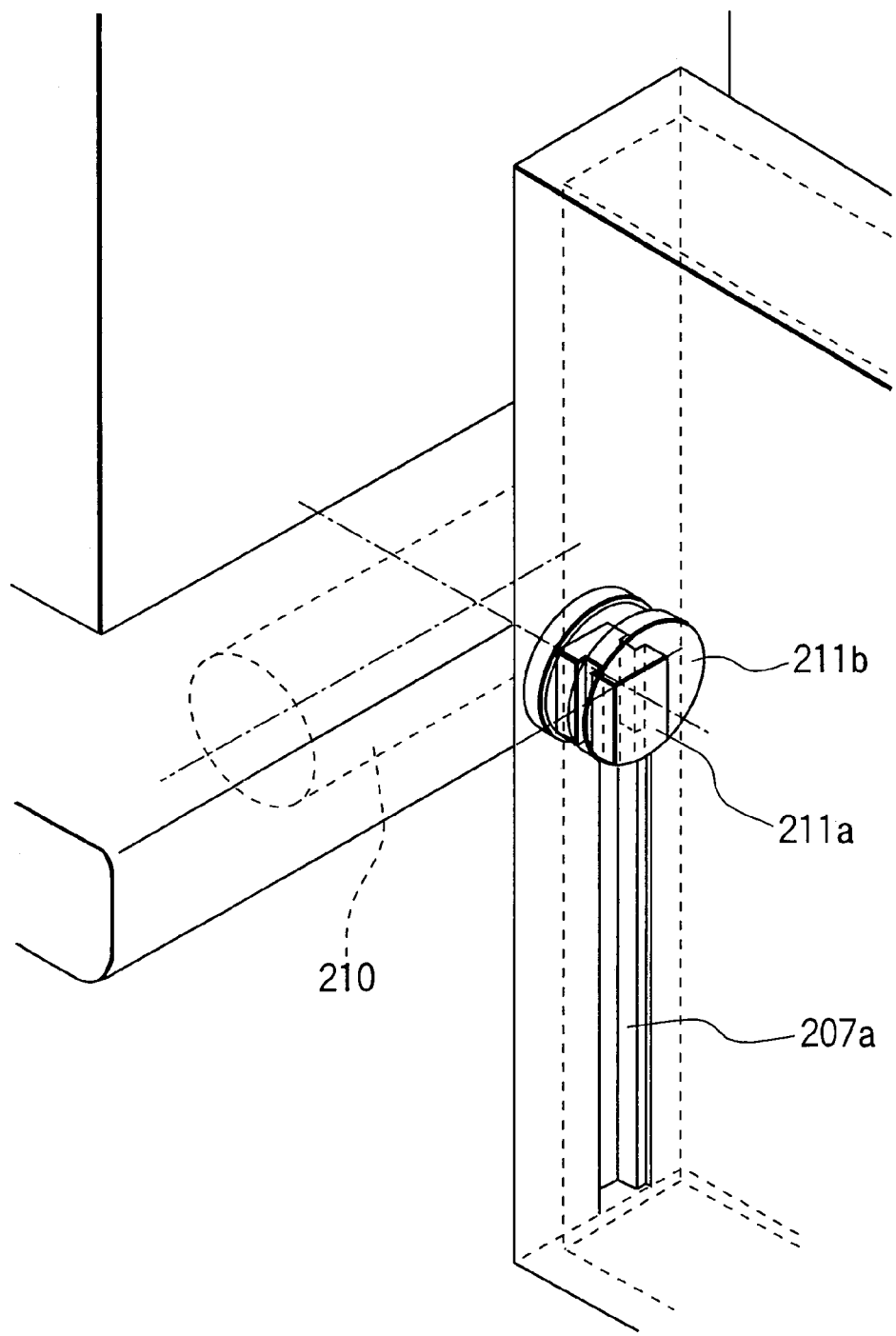
FIG. 13 is an enlarged view showing a part of the video camera according to the second embodiment in the neighborhood of a hinge part 211 shown in FIG. 11.

FIG. 13 is an enlarged view showing the hinge part 211 in a state obtained when the display part 207 is in the position shown in FIG. 10. The hinge part 211, which is rotatable on the axis Y as shown in FIG. 10, is composed of a slide member 211a and a rotating member 211b. The slide member 211a is secured to the video camera body and is arranged to be slidable along a guide member 207a of the display part 207 and to connect the display part 207 with the video camera body. The rotating member 211b is located at the middle part of one minor side of the display part 207. The rotating member 211b is thus arranged, as shown in FIG. 13, to allow the display part 207 to rotate on the axis Y when the slide member 211a and the rotating member 211b fit on each other into one body.

Figure 14:
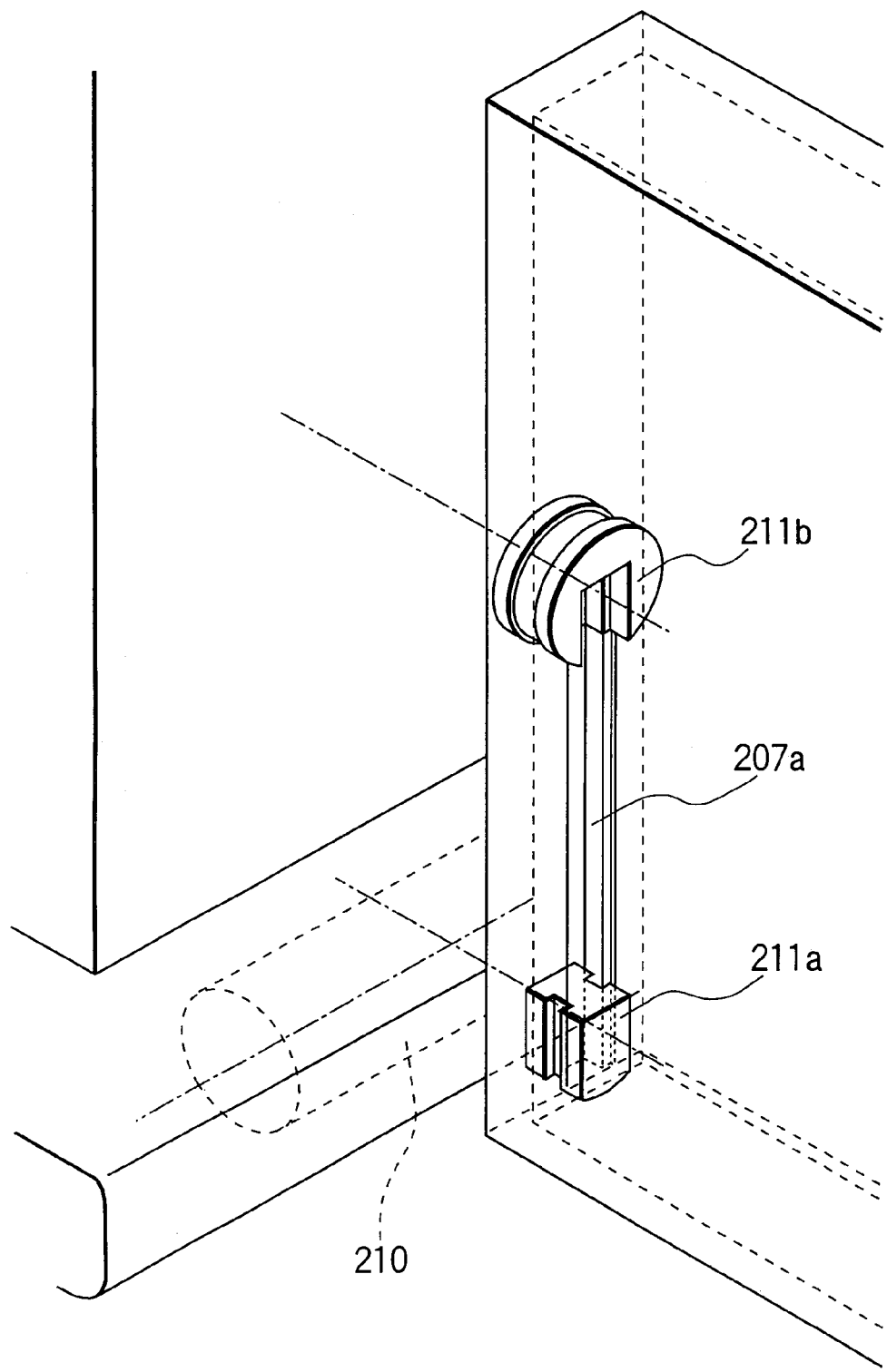
FIG. 14 is an enlarged view showing the same part of the video camera in the neighborhood of the hinge part 211.

FIG. 14 is an enlarged view showing the hinge part 211 in a state obtained when the display part 207 is in the position shown in FIG. 11. In the case of FIG. 14, the slide member 211a and the rotating member 211b are separated from each other. While the rotating member 211b stays at one end of the guide member 207a, the slide member 211a has moved to the other end of the guide member 207a. Under this condition, the display part 207 does not rotate, because there remains only the slide member 211a at a connection part between the video camera body and the display part 207. In other words, in the state suited for picking up images as shown in FIG. 11, the display part 207 is fixed in position without rotating in the direction of the axis Y, so that a shooting operation can be performed always in a stable condition while enabling images being picked up to be viewed. Further, in the state of FIG. 14, the display part 207 is located near to the position of the lens part 201 through which the light of the shooting object is obtained. In this state, therefore, the deviation of optical axis can be lessened to permit adequate shooting. Besides, the video camera either can be put on the ground or can be secured to a tripod or the like in this state.

FIG. 15 shows the video camera in a state obtained by rotating the display part 207 180 degrees from the position shown in FIG. 9 by using the hinge part 211 to cause the display image plane to face outside. This state is suited for reproduction display of images stored in the image storing part 204. When the position of the display part 207 is found to be in the state of FIG. 15 by the on-state of the detecting switch 209, the control part 208 instructs the display signal forming part 205 to rotate the image display on the display image plane of the display part 207 90 degrees from the normal display state shown in FIG. 11, etc., i.e., a display state of having the horizontal plane of the image in correspondence to the major-side direction of the display image plane, in such a way as to reverse the relation between horizontal and vertical scanning directions, and further to make the image display in a reduced state, as shown in FIG. 15.

When the display part 207 is in the position shown in FIG. 11, i.e., when the detecting switch 209 is in an off-state, on the other hand, the control part 208 instructs the display signal forming part 205 to make the normal display in which the horizontal plane of the image corresponds to the major-side direction of the display image plane.

When an image is displayed with the display part 207 in the position shown in FIG. 15, the image on display is in conformity to the horizontal direction of the erected posture of the video camera body, so that the image is adequately appreciable.

As described above, the arrangement of the second embodiment permits to mount a relatively large display part even on a video camera body of a rectangular parallelepiped shape extending longer in the direction of height. Another advantage of the second embodiment lies in that the display part can be easily set immovable in shooting. A further advantage lies in that the second embodiment is arranged to lessen a deviation of optical axis, so that an image can be adequately picked up.

Figure 16A:
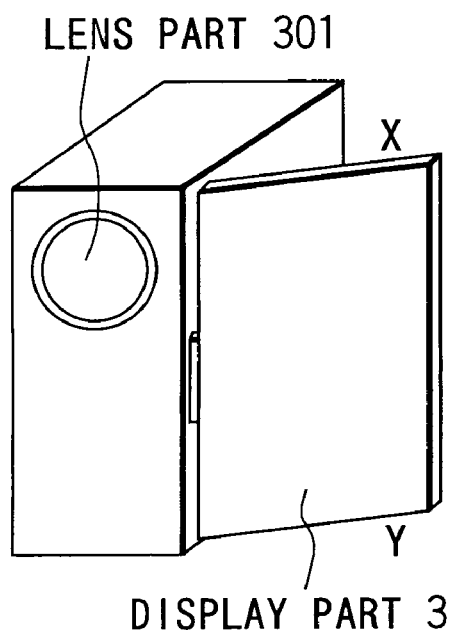
FIG. 16(a) is a perspective view schematically showing a video camera according to a third or fourth embodiment of the invention as viewed from the front side thereof in the image pickup mode.
Figure 16B:
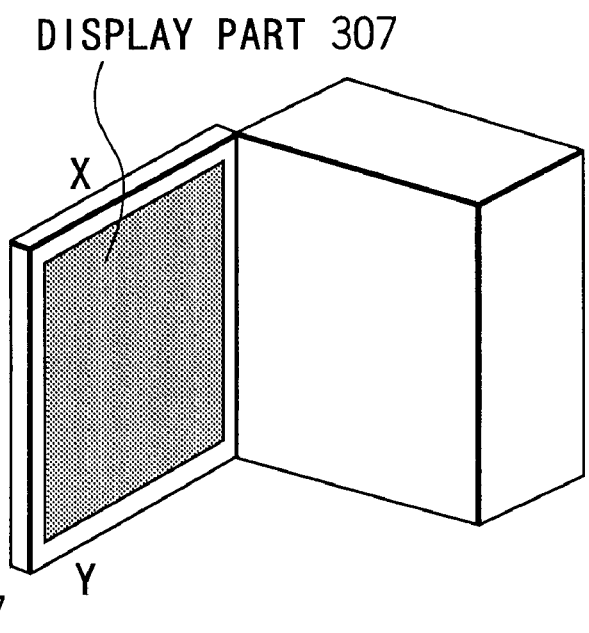
FIG. 16(b) is a perspective view schematically showing the video camera according to the third or fourth embodiment of the invention as viewed from the rear side thereof in the image pickup mode.
Figure 17:
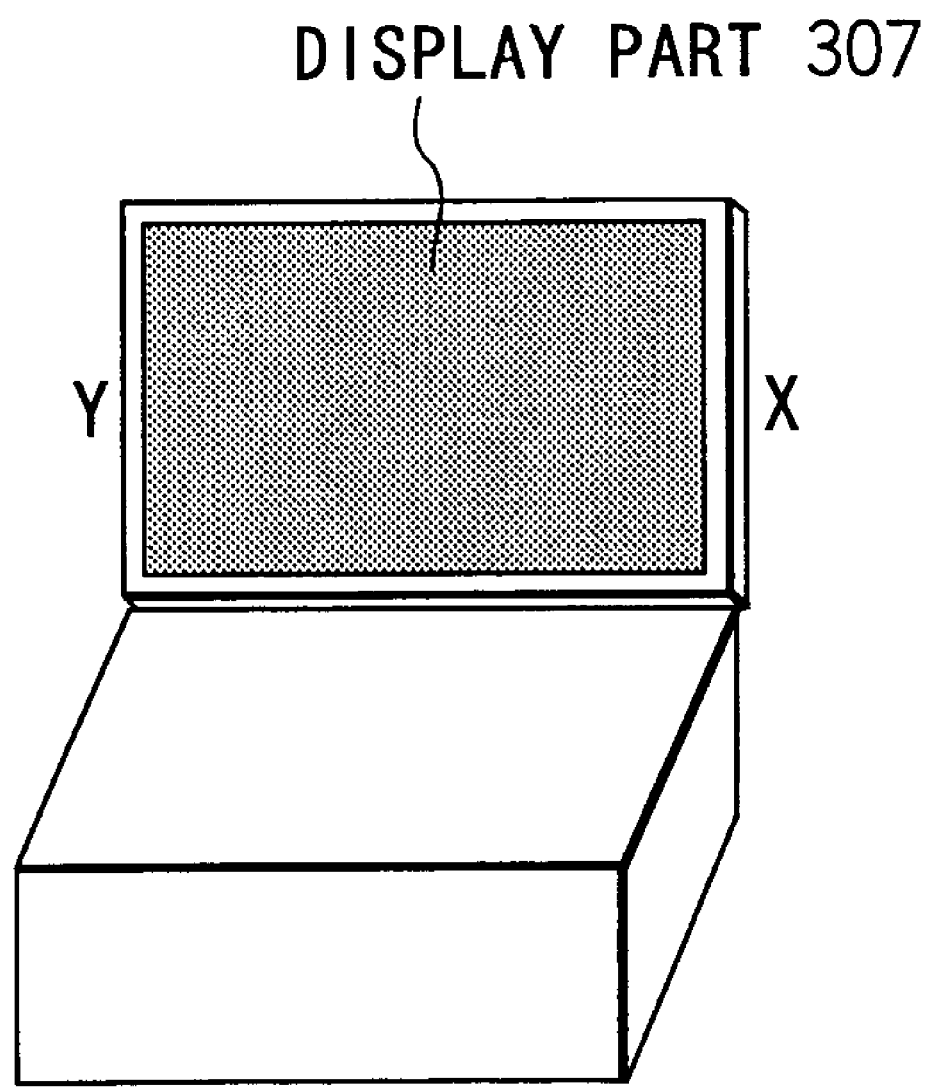
FIG. 17 is a perspective view schematically showing the video camera according to the third or fourth embodiment in the image reproducing mode.

FIGS. 16(a) and 16(b) and FIG. 17 are simplified perspective views of a video camera according to a third embodiment of the invention.

FIGS. 16(a) and 16(b) show the video camera according to the third embodiment in a state obtained during a shooting operation. The video camera is shown as viewed from a point located obliquely in front of the video camera in FIG. 16(a) and as viewed from a point located obliquely in rear of the video camera. The body of the video camera has a rectangular shape extending longer in the direction of height. A display part 307 which is composed of an LCD or the like is arranged to be stowed along one side face of the video camera body, which is in a rectangular parallelepiped shape extending longer in the direction of height. In the case of the third embodiment, the aspect ratio of the display image plane of the display part 207 is set reverse to the conventional aspect ratio. Incidentally, the aspect ratio of the display image plane is set to 4:3. A lens part 301 is arranged to obtain an optical image of an object of shooting.

FIG. 17 shows the video camera according to the third embodiment in a state of having the display part 307 in a posture for reproducing and displaying images picked up. As shown in FIG. 17, in reproducing images, the aspect ratio of the display part 307 is reversed by setting the video camera body sideways. In FIGS. 16(*a*), 16(*b*) and 17 and also in FIGS. 19(*a*) and 19(*b*) which will be described later, reference symbols X and Y denote respectively the same sides of the display part 307.

Figure 18:
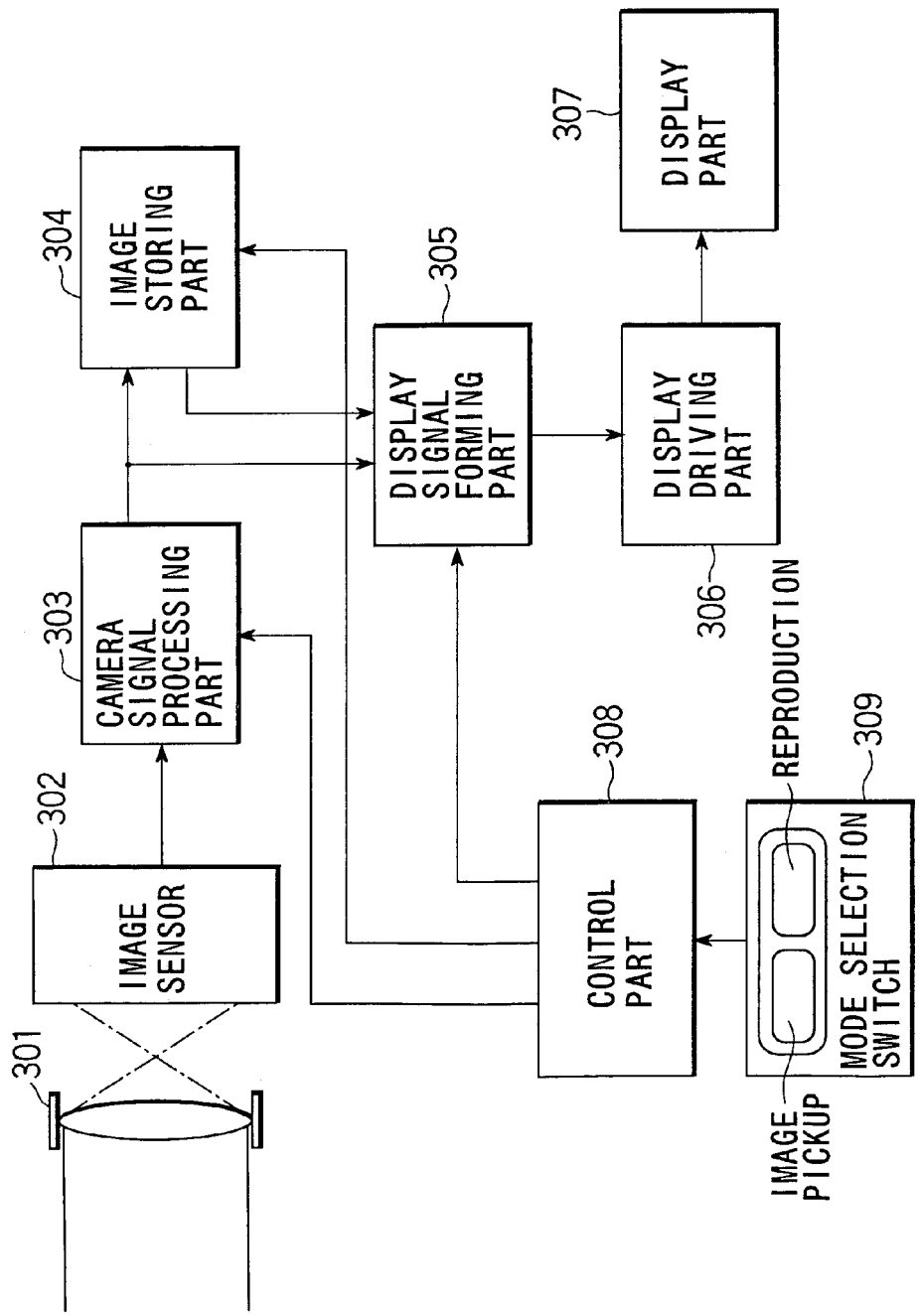
FIG. 18 a block diagram showing by way of example the arrangement of the video camera according to the third embodiment.

FIG. 18 is a block diagram showing the arrangement of the video camera according to the third embodiment. Referring to FIG. 18, the lens part 301 is arranged to obtain an optical image of the object of shooting. An image sensor 302 is arranged to photo-electrically convert the image of the shooting object coming from the lens part 301 into an electrical signal. A control part 308 is composed of a CPU, etc., and is arranged to perform control over the whole video camera. A camera signal processing part 303 is arranged to form luminance and color-difference signals by matrix-processing the signal coming from the image sensor 302 and to carry out processing actions such as a gamma correction process, A/D conversion, etc., on these signals.

An image storing part 304 is composed of a magnetic tape or a semiconductor memory and is arranged to store the signals processed by the camera signal processing part 303. The display part 307 which is composed of an LCD, etc., as mentioned above is arranged to display an image picked up by the image sensor 302 or an image stored by the image storing part 304. A display signal forming part 305 is arranged to form a signal for displaying on the display part 307 by converting the signal obtained from the camera signal processing part 303 or from the image storing part 304 in accordance with a predetermined format. A display driving part 306 is arranged to drive and cause the display part 307 to display thereon an image obtained on the basis of the signal formed by the display signal forming part 305.

A mode selection switch 309 is provided for switching between an image pickup mode and an image reproducing mode. When the image pickup mode is selected by the mode selection switch 309, a driving action on the image sensor 302 begins. An image signal outputted from the camera signal processing part 308 is displayed on the display part 307. Then, in response to an operation on a trigger button (not shown), the image signal begins to be written into the image storing part 304. If the image reproducing mode is selected, image data stored in the image storing part 304 is read and an image corresponding to the read data is displayed on the display part 307.

Figure 19B:
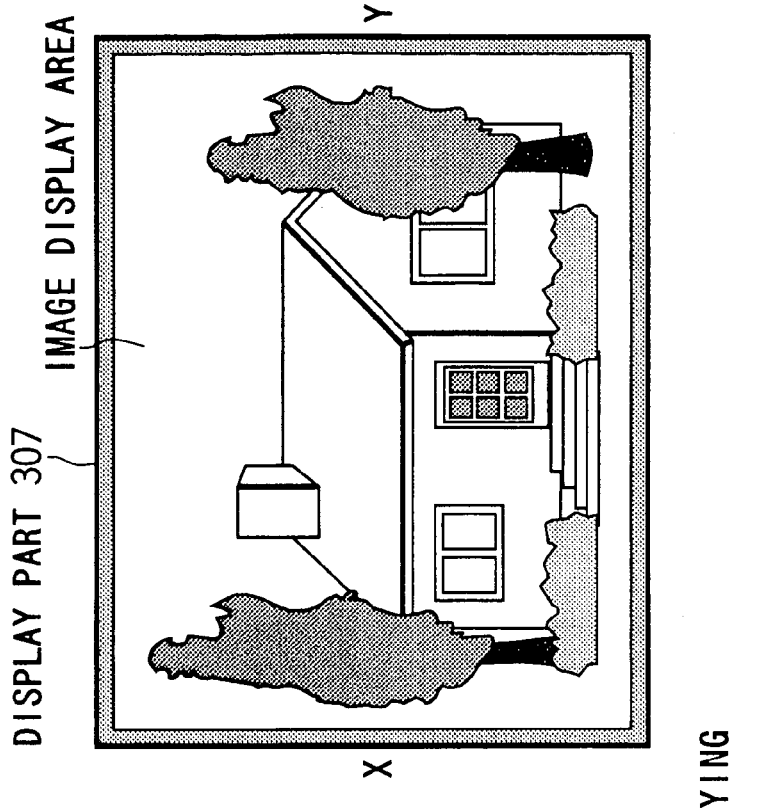
FIG. 19(b) shows one example of display made on the display image plane of the display part in the third embodiment in the image reproducing mode.
Figure 19A:
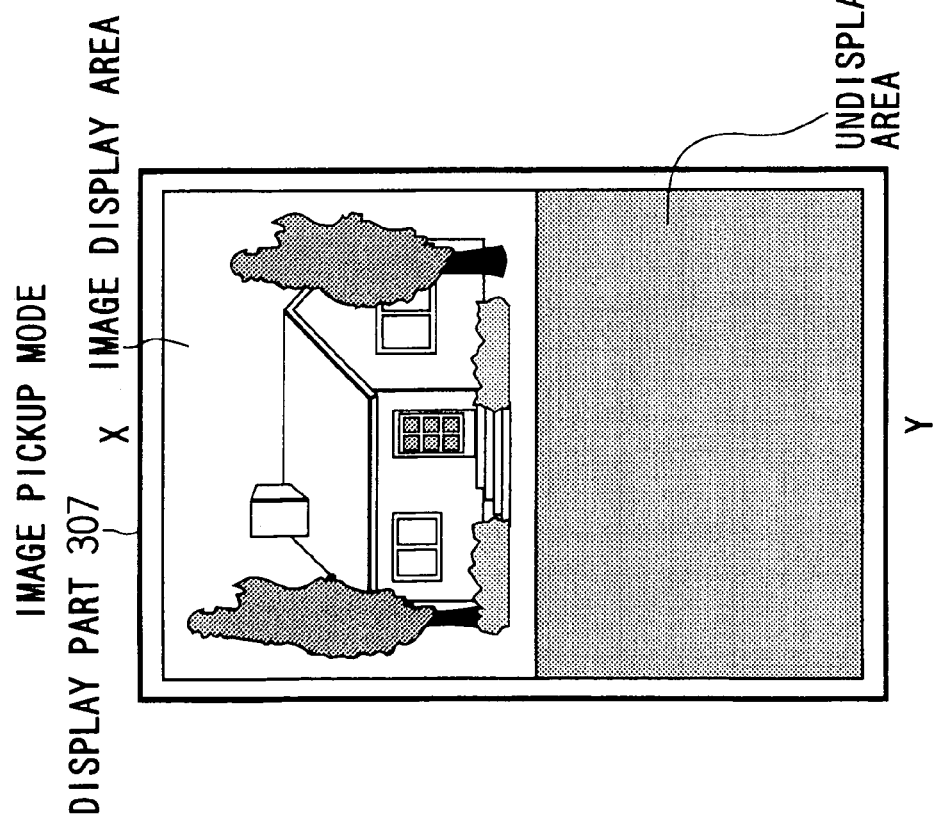
FIG. 19(a) shows one example of display made on a display image plane of a display part in the third embodiment in the image pickup mode.
Figure 20:
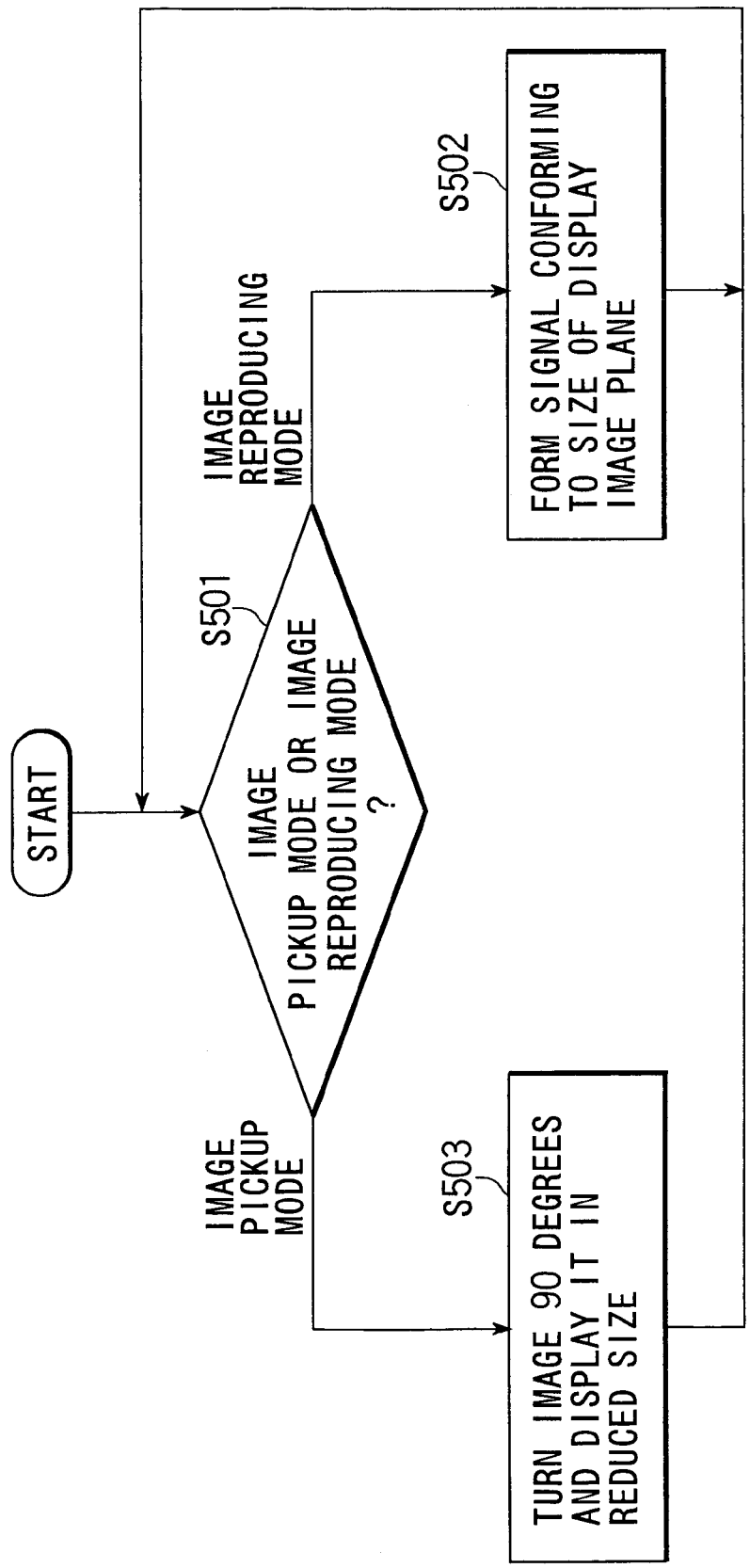
FIG. 20 is a flow chart showing processes to be executed for display control in the third embodiment.

FIG. 19(*a*) shows the display image plane of the display part 307 in a state obtained when the video camera is in the image pickup mode. FIG. 19(*b*) shows the display image plane of the display part 307 in a state obtained when the video camera is in the image reproducing mode. FIG. 20 is a flow chart showing the flow of a display control operation on the display part 307 in the third embodiment. The display operation of the third embodiment is described below with reference to FIGS. 19(*a*), 19(*b*) and 20.

At a step S501 of FIG. 20, the control part 308 detects the position of the mode selection switch 309 to make a discrimination between the image reproducing mode and the image pickup mode. If the position of the mode selection switch 309 is found to indicate the image reproducing mode, the control part 308 sends out a signal to inform the display signal forming part 305 of the selection of the image reproducing mode and causes the image sensor 302 and the camera signal processing part 303 to begin to be driven. The flow of operation then proceeds from the step S501 to a step S502.

At the step S502, in response to the signal from the control part 308, the display signal forming part 305 forms a signal for displaying images in a size conforming to the size of the display image plane of the display part 307, as shown in FIG. 19(*b*). In other words, the display signal forming part 305 acts to have a reproduced image displayed over the whole display area of the display part 307, or over an area approximately equal to the whole display area, to enable the operator of the video camera to adequately view the image on display. Further, the display image plane which is used in the image reproducing mode as shown in FIG. 19(*b*) is readily obtainable by setting the video camera body sideways as shown in FIG. 17.

If the position of the mode selection switch 309 is found at the step S501 to indicate the image pickup mode, the control part 308 sends a signal to inform the display signal forming part 305 of the selection of the image pickup mode. The flow of operation then proceeds from the step S501 to a step S503.

At the step S503, in response to the signal from the control part 308, the display signal forming part 305 forms a signal which causes the image display made in the image reproducing mode to rotate around 90 degrees and which causes the image reduced in size from the size obtained in the image reproducing mode to be displayed, as shown in FIG. 19(*a*). More specifically, in the image pickup mode, the large image plane of the display part 307 is not used as it is but the display area of the display part 307 is used only in part by adjusting the length in the horizontal direction of the picked-up image to the length of the minor side of the display image plane. The arrangement for making the image display in a reduced size enables the operator to view the picked-up image in its entirety, despite the fact that the display part 307 is arranged to have the aspect ratio which differs from the conventional aspect ratio. Further, the display image plane which is obtained in the image pickup mode as shown in FIG. 19(*a*) is to be used for viewing with the video camera body set in its erected posture as shown in FIGS. 16(*a*) and 16(*b*).

Figure 21:
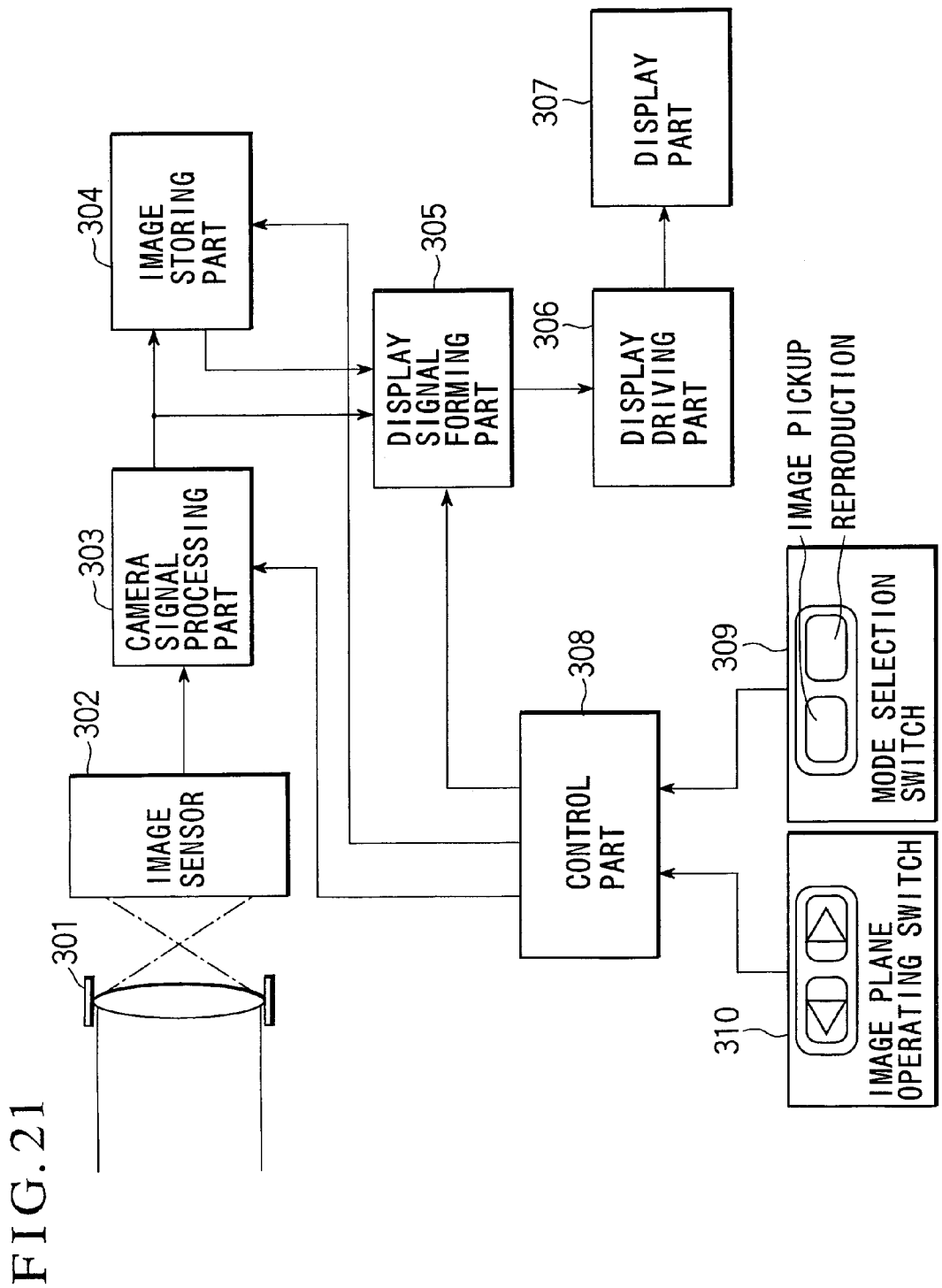
FIG. 21 is a block diagram showing by way of example the arrangement of the video camera according to the fourth embodiment of the invention.

A video camera according to a fourth embodiment of the invention is arranged to display the picked-up image not in a reduced size in the image pickup mode. FIG. 21 is a block diagram showing the arrangement of the video camera according to the fourth embodiment. The arrangement shown in FIG. 21 is similar to the arrangement of the third embodiment shown in FIG. 18 except that the fourth embodiment is provided with an image plane operating switch 310. Therefore, all parts similar to those of the third embodiment are indicated by the same reference numerals in FIG. 21, and the details of them are omitted from the following description.

FIGS. 22(*a*), 22(*b*) and 22(*c*) schematically show the various display states of the display part 307 as obtained under the display control of the image plane control switch 310 in the image pickup mode in the fourth embodiment.

With a check made for the position of the mode selection switch 309, if the mode selection switch 309 is found to be selecting the image pickup mode, the control part 308 sends a signal indicating the result of the check to the display signal forming part 305. Upon receipt of the signal, the display signal forming part 305 forms a display signal in such a way as to have a picked-up image displayed in a state of having rotated 90 degrees. More specifically, the horizontal and vertical scanning directions of the video camera are made to be converse by the display signal. As a result, an image is obtained on the display part 307 in a state as shown in FIG. 22(b).

In such a state of display, however, some parts (hatched parts) of the image are not displayed, as shown in FIG. 22(b), because of the difference in aspect ratio between the image and the display image plane. Therefore, if the operator wishes to view the parts of the image missing from the display made on the display part 307, the image plane operating switch 310 is used. In a case where the operator wishes to view the missing part on the right side of the image, a button located on the right side of the image plane operating switch 310 is operated. Then, upon detection of the selection of the right side button, the control part 308 instructs the display signal forming part 305 to display the right side of the image. In response to this instruction, the display signal forming part 305 controls the displayed portion of the image in such a way as to scroll it to the right as shown in FIG. 22(c). If the operator wishes to view the missing part on the left side of the image on display, a button located on the left side of the image plane operating switch 310 is operated. Then, the display signal forming part 305 is caused to control the displayed position of the image to scroll it to the left as shown in FIG. 22(a). The use of the image plane operating switch 310 thus enables the display part 307 to make an apposite display, despite the fact that the display part 307, unlike an ordinary display device, has an aspect ratio which gives a vertically long image plane.

The fourth embodiment is arranged to carry out display control in the image pickup mode by rotating 90 degrees the display image plane from the position obtained in the image reproducing mode. However, this arrangement gives an inadequate appearance to the display plane, as it causes the display part 307 to leave some undisplaying areas on the display plane, as shown in FIGS. 22(a) to 22(c). Therefore, to solve this problem, as shown in FIGS. 23(a) to 23(c), in the image pickup mode, the arrangement may be changed to rotate 90 degrees the display image plane from the position obtained in the image reproducing mode and to eliminate the undisplaying areas by enlarging the display area in such a way as to make the length of display in the vertical direction of the displayed image approximately coincide with the length of the display area in the vertical direction of the display part. Such an enlarging display as shown in FIGS. 23(a) to 23(c) gives a better appearance of the display image plane by removing all the undisplaying areas from the display image plane.

In each of the third and fourth embodiments described above, the state of the image display on the display part 307 is changed from one state over to another according to the switching between the image pickup mode and the image reproducing mode. However, this arrangement may be changed to additionally set a display change-over switch and to switch the selection of one of the two modes according to the change-over action of this switch, as shown in FIGS. 19(a) and 19(b).

Further, the display part used in each of the third and fourth embodiments has a display image plane of an aspect ratio of 4:3. However, the display image plane may be changed to a wide display image plane of an aspect ratio of, for example, 16:9. This modification applies also to another embodiment which will be described next.

Figure 24A:
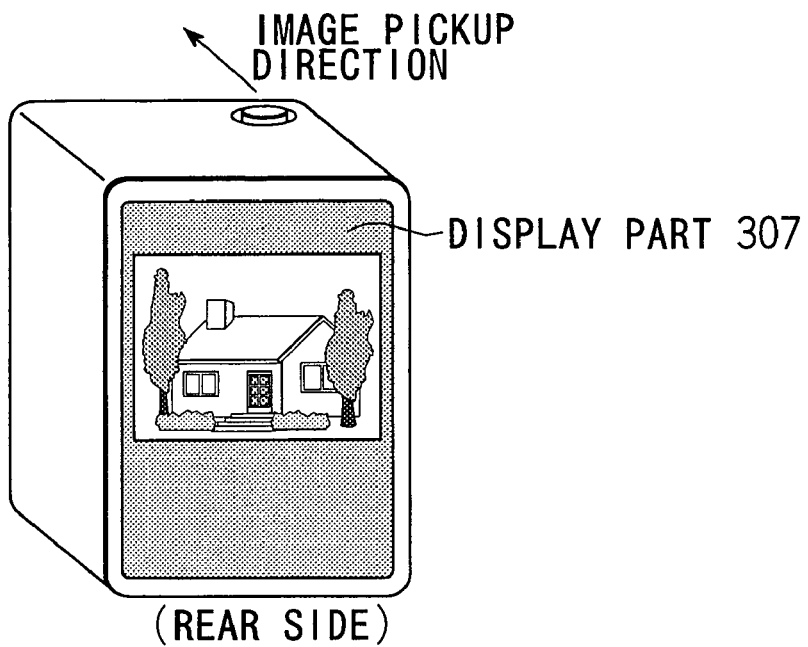
FIG. 24(a) is a perspective view schematically showing a video camera which is a modification of the third or fourth embodiment in a state obtained in the image pickup mode.
Figure 24B:
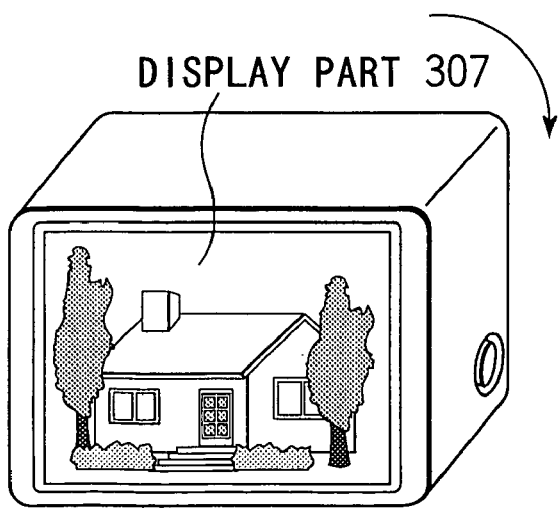
FIG. 24(b) is a perspective view schematically showing the video camera which is the modification of the third or fourth embodiment in a state obtained in the image reproducing mode.
Figure 25A:
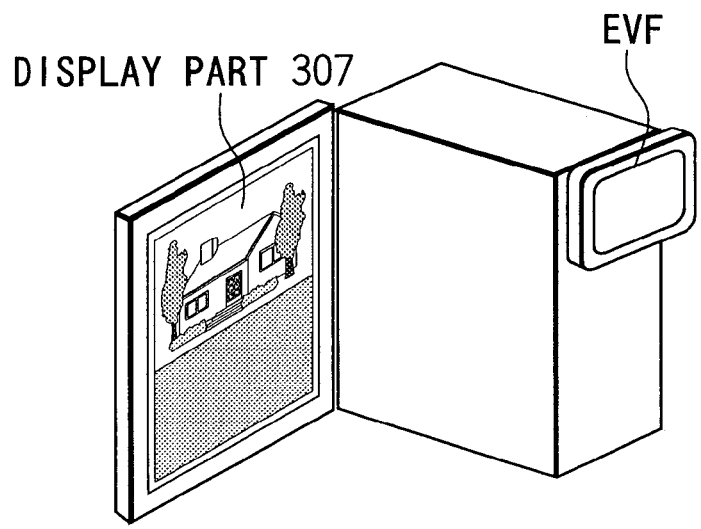
FIG. 25(a) is a perspective view schematically showing a video camera which is a further modification of the third or fourth embodiment in a state obtained in the image pickup mode.
Figure 25B:
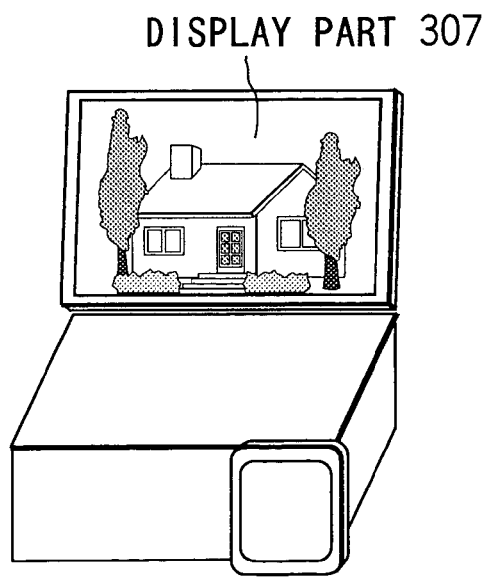
FIG. 25(b) is a perspective view schematically showing the video camera which is the further modification of the third or fourth embodiment in a state obtained in the image reproducing mode.

In each of the third and fourth embodiments described above, the display part is disposed on one side face of the video camera body, as shown in FIGS. 16(a), 16(b) and 17. However, the object of each of the third and fourth embodiments can be likewise attained by changing that arrangement to have the display part disposed on the rear face of the video camera body, as shown in FIGS. 24(a) and 24(b). The object of each of the third and fourth embodiments also can be likewise attained in a video camera having an EVF (electronic viewfinder) disposed as shown in FIGS. 25(a) and 25(b).

As apparent from the foregoing description, each of the third and fourth embodiments is arranged to enable the operator to view the picked-up images by making a display appositely to the operating conditions of the video camera without having any limitation imposed by the rectangular parallelepiped shape of the video camera extending longer in the direction of height.

Figure 26A:
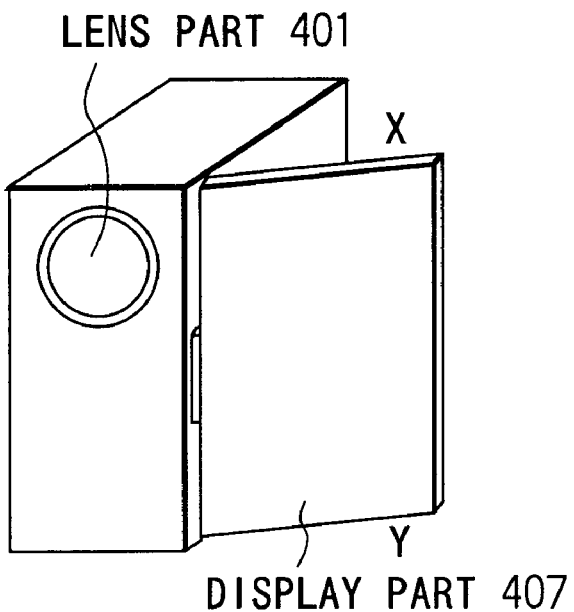
FIG. 26(a) is a perspective view schematically showing a video camera according to a fifth embodiment of the invention as viewed from the front side thereof in the image pickup mode.
Figure 26B:
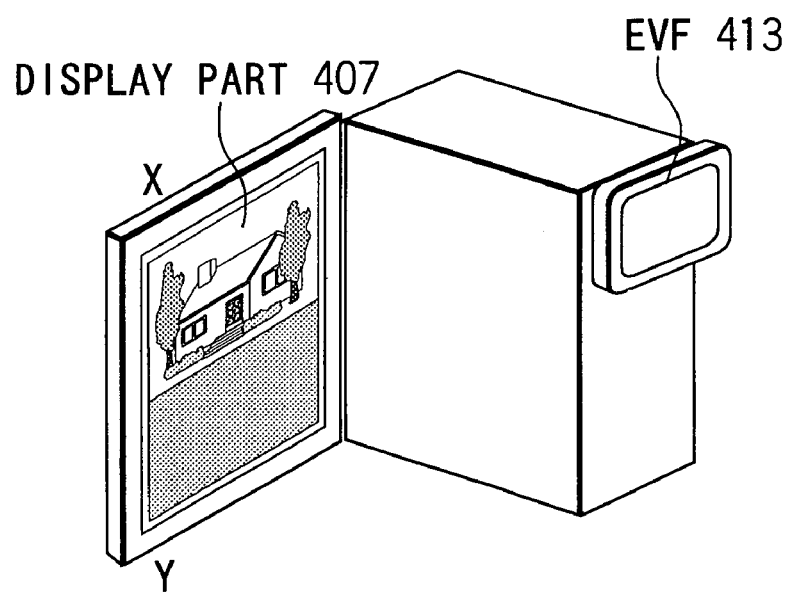
FIG. 26(b) is a perspective view schematically showing the video camera according to the fifth embodiment as viewed from the rear side thereof in the image pickup mode.
Figure 27:
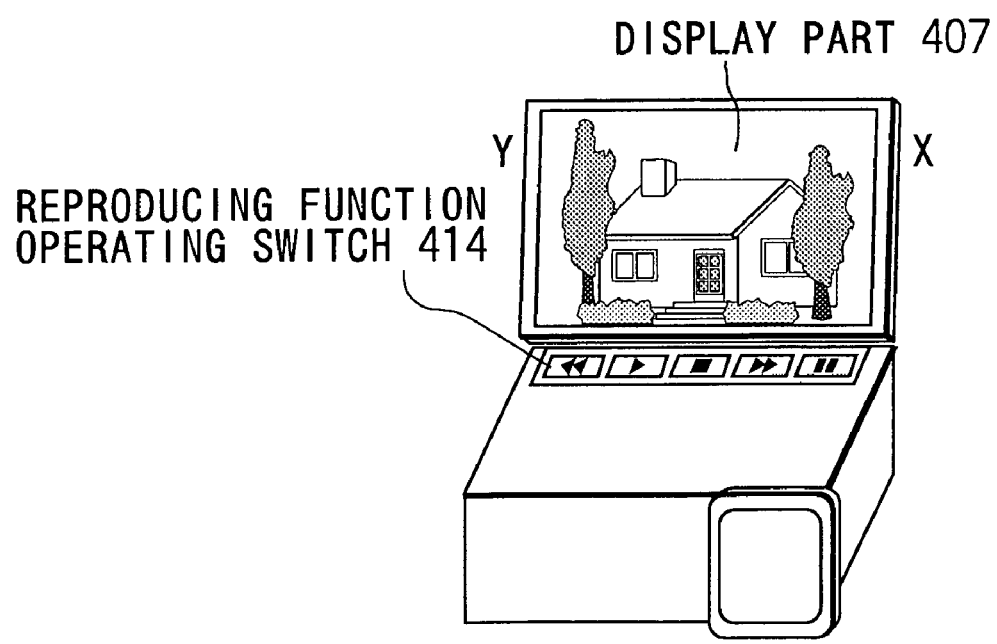
FIG. 27 schematically shows the video camera according to the fifth embodiment in a state obtained in the image reproducing mode.

FIGS. 26(a), 26(b) and 27 are simplified perspective views showing a video camera according to a fifth embodiment of the invention.

In FIGS. 26(a) and 26(b), the video camera is shown in a state obtained during the image pickup operation. FIG. 26(a) shows the video camera as viewed obliquely from the front side thereof. FIG. 26(b) shows the video camera as viewed obliquely from the rear side thereof. The video camera has a display part 407 which is composed of an LCD or the like. The display part 407 is arranged to be stowed along one side face of the vertically long body of the video camera. This means that, in the case of the fifth embodiment, the display part 407 has the aspect ratio of its display image plane arranged to be reverse to the conventional aspect ratio. Incidentally, in the fifth embodiment, the aspect ratio of the display image plane is assumed to be 4:3. A lens part 401 is arranged to obtain an optical image of a shooting object.

Figure 29B:
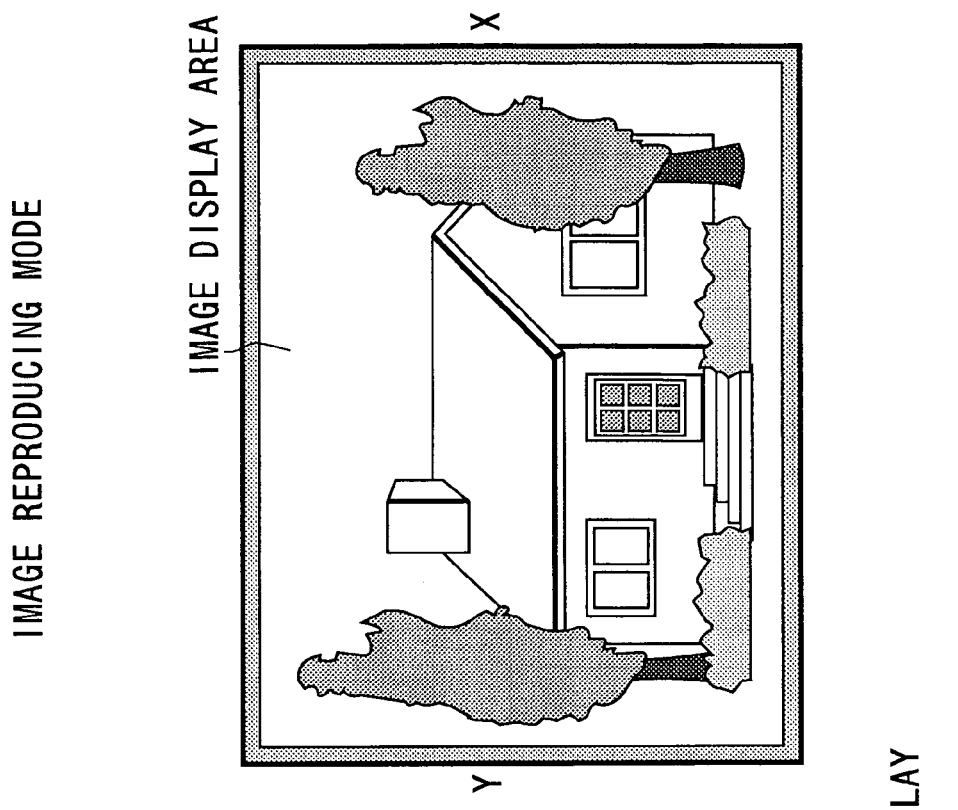
FIG. 29(b) shows one example of display made on the display image plane of the display part in the image reproducing mode in the fifth embodiment.
Figure 29A:
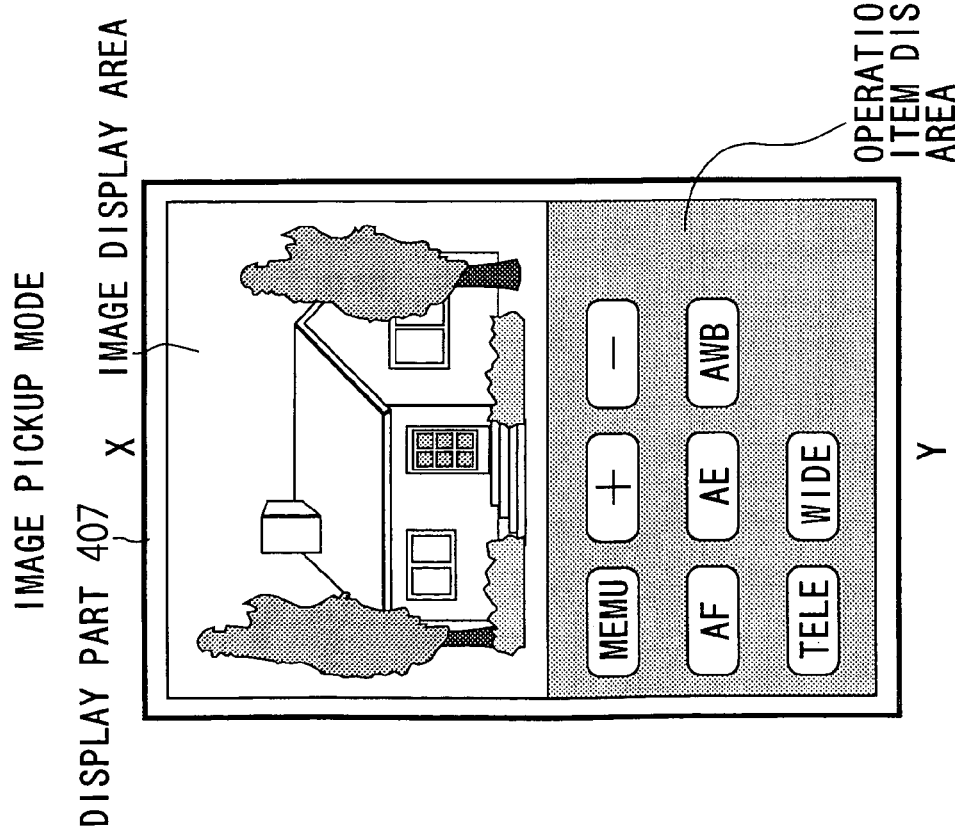
FIG. 29(a) shows one example of display made on a display image plane of a display part in the image pickup mode in the fifth embodiment.

FIG. 27 shows the video camera in a posture obtained in displaying a picked-up image on the display part 407. In reproducing video images, the video camera body is set sideways to have the video images reproduced with the aspect ratio of the display part 407 reversed. A reproducing function operating switch 414 is provided in the neighborhood of the display part 407 to permit various image reproducing operations, such as fast image feeding, rewinding the tape, putting an image to a pause, etc. In FIGS. 26(a), 26(b), and 27 and also in FIGS. 29(a) and 29(b) to be described later, reference symbols X and Y respectively denote the same parts.

FIG. 28 is a block diagram showing the arrangement of the video camera according to the fifth embodiment. Referring to FIG. 28, the lens part 401 is arranged as mentioned above to obtain an optical image of the object of shooting. An image sensor 402 is arranged to photo-electrically convert the image of the shooting object coming from the lens part 401 into an electrical signal. A control part 408 is composed of a CPU, etc., and is arranged to perform control over the whole video camera. A camera signal processing part 403 is arranged to form luminance and color-difference signals by matrix-processing the signal coming from the image sensor 402 and to carry out processing actions such as a gamma correction process, A/D conversion, etc., on these signals.

An image storing part 404 is composed of a magnetic tape or a semiconductor memory and is arranged to store the signals processed by the camera signal processing part 403. The display part 407 is composed of an LCD, etc., as mentioned above. The display part 407 is arranged to display an image picked up by the image sensor 402 or an image stored by the image storing part 404. A display signal forming part 405 is arranged to form a signal for displaying an image on the display part 407 by converting the signal obtained from the camera signal processing part 403 or the image storing part 404 in accordance with a predetermined format. A display driving part 406 is arranged to drive and cause the display part 407 to display thereon an image on the basis of the signal formed by the display signal forming part 405.

A mode selection switch 409 is provided for switching between an image pickup mode and an image reproducing mode. When the image pickup mode is selected by the mode selection switch 409, a driving action on the image sensor 402 begins. An image corresponding to the image signal outputted from the camera signal processing part 403 is displayed on the display part 407. Then, in response to an operation on a trigger button (not shown), the image signal begins to be written into the image storing part 404. If the image reproducing mode is selected, image data stored in the image storing part 404 is read out and an image corresponding to the read-out data is displayed on the display part 407.

A touch panel 410 is disposed on the display part 407. A position detecting part 411 is arranged to detect a position on the touch panel 410 touched by the operator and to transmit information on the touched position to the control part 408. A zoom driving part 412 is arranged to control the position of a zoom lens included in the lens part 401 in accordance with a command coming from the control part 408. The reproducing function operating switch 414 is provided for various image reproducing operations as mentioned above.

Figure 30:
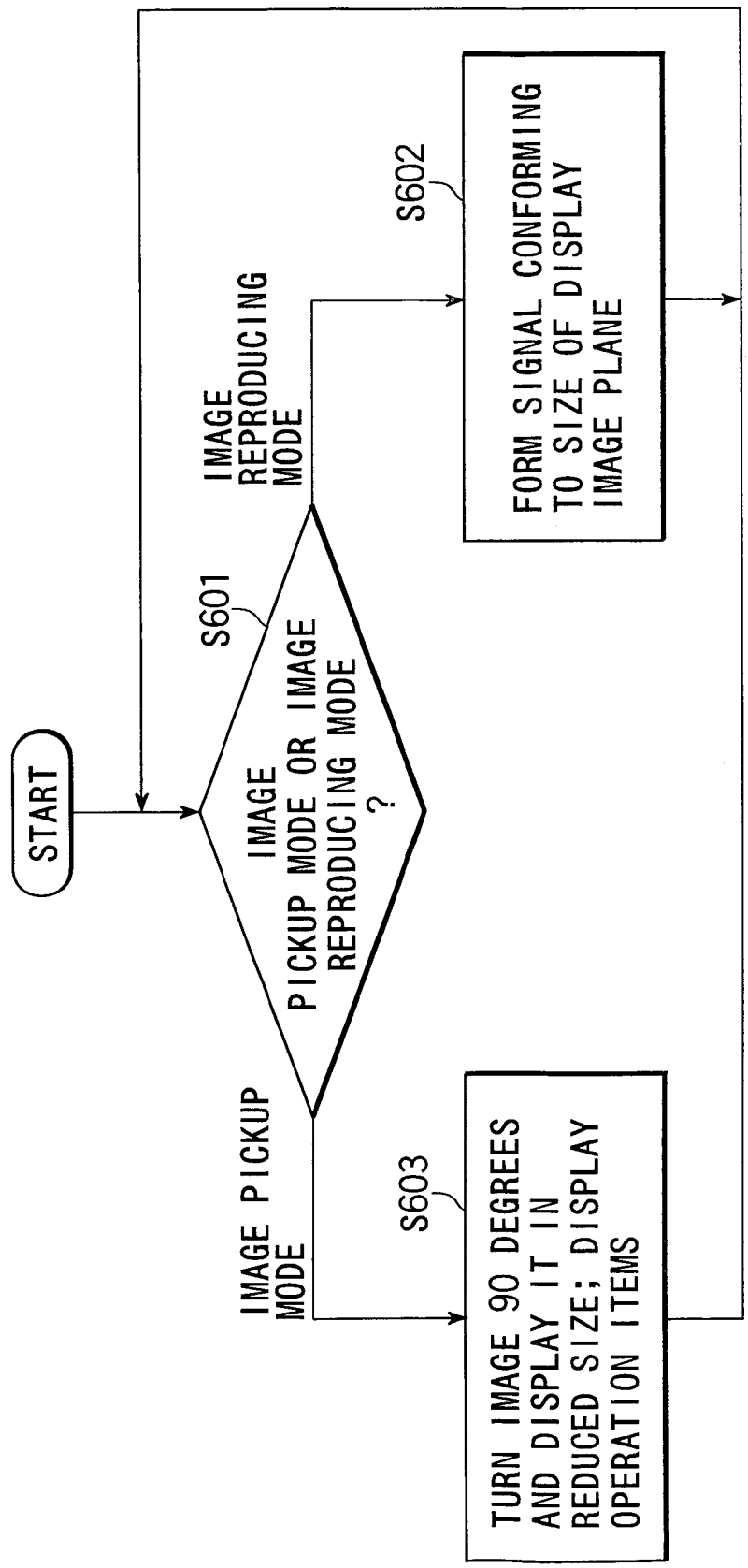
FIG. 30 is a flow chart showing processes to be executed for display control in the fifth embodiment.

FIG. 29(*a*) shows the display image plane of the display part 407 in a state obtained when the video camera is in the shooting mode. FIG. 29(*b*) shows the display image plane of the display part 407 in a state obtained when the video camera is in the image reproducing mode. FIG. 30 is a flow chart showing the flow of a display operation on the display part 407 in the fifth embodiment.

At a step S601 of FIG. 30, the control part 408 detects the position of the mode selection switch 409 to make a discrimination between the image reproducing mode and the image pickup mode. If the position of the mode selection switch 409 is found to indicate the image reproducing mode, the control part 408 sends out a signal to inform the display signal forming part 405 of the selection of the image reproducing mode and causes the image sensor 402 and the camera signal processing part 403 to begin to be driven. The flow of operation then proceeds from the step S601 to a step S602.

At the step S602, in response to the signal from the control part 408, the display signal forming part 405 forms a signal for displaying an image in a size conforming to the size of the display image plane of the display part 407, as shown in FIG. 29(*b*). In other words, the display signal forming part 405 acts to have a reproduced image displayed over the whole display area of the display part 407, or over an area approximately equal to the whole display area, to enable the operator of the video camera to adequately view the image on display. Further, the display image plane obtained in the image reproducing mode as shown in FIG. 29(*b*) becomes readily viewable by setting the video camera body sideways as shown in FIG. 27.

If the position of the mode selection switch 409 is found by the control part 408 at the step S601 to indicate the image pickup mode, the control part 408 then sends a signal to inform the display signal forming part 405 of the selection of the image pickup mode. The flow of operation then proceeds from the step S601 to a step S603.

At the step S603, in response to the signal from the control part 408, the display signal forming part 405 forms a signal for causing the image display made in the image reproducing mode to rotate 90 degrees (i.e., reversing the relation between horizontal and vertical scanning directions) and for displaying an image reduced in size from the display size of the image reproducing mode, as shown in FIG. 29(*a*). In other words, in the image pickup mode, the large image plane of the display part 407 is not used as it is but the display area of the display part 407 is used only in part by adjusting the length in the horizontal direction of the picked-up image to the length of the minor side of the display image plane. Such an arrangement for making the image display in a reduced size enables the operator to view the picked-up image in its entirety, despite the fact that the display part 407 is arranged to have the aspect ratio which differs from the conventional aspect ratio.

Further, the reduction in size of the image leaves an unused area on the display image plane. This remaining area is used as an operation item display area for displaying some items of operation that are necessary for carrying out an image pickup operation. When the operator touches one of various parts of the operation item display area to give an instruction for execution of a specific action of the image pickup function, the specific action is carried out. The image pickup function includes various actions, such as an automatic focusing action, an automatic exposure adjusting action, an automatic white balance adjusting action, a zooming action, etc. Thus, an instruction part for enabling the operator to give an instruction for the image pickup operation is provided in a position closest to the image display, so that the operability of the video camera can be enhanced. Further, there is no need to provide any instruction members, such as operation buttons, on the video camera body, so that the reduction in size of the video camera can be furthered. Incidentally, the display image plane obtained in the image pickup mode as shown in FIG. 29(*a*) is viewed by the operator with the video camera body set in its erected posture as shown in FIGS. 26(*a*) and 26(*b*).

Figure 31:
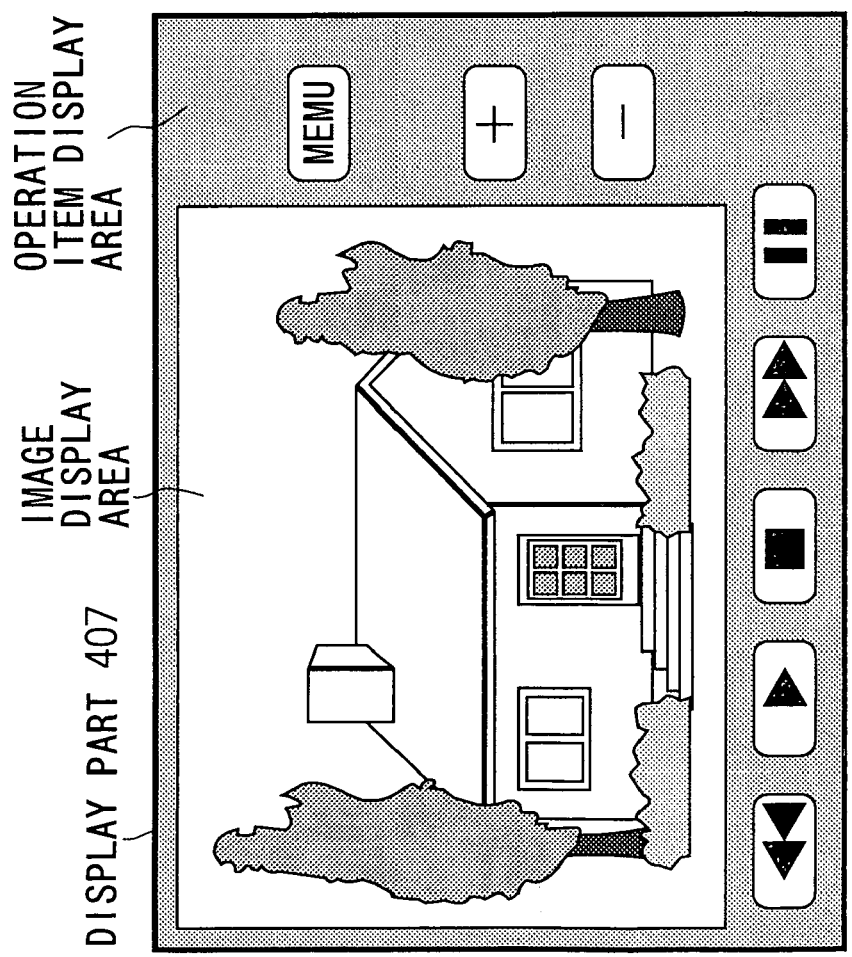
FIG. 31 shows one example of display made on the display image plane of the display part in the image reproducing mode in the fifth embodiment.

In the fifth embodiment, an image obtained in the image reproducing mode is displayed in the same size, or about the same size, as the size of the display image plane. However, this arrangement may be changed to display the reproduced image in a smaller display size and to display, along with the image display on the same image plane, some reproducing operation items such as fast image feeding, tape rewinding, pausing of the display image, etc., as shown in FIG. 31. Such a modification enables the operator to easily carry out a desired image reproducing operation to give a desired instruction by simply touching the display area of an applicable operation item on display on the image plane. The modification thus obviates the necessity of arranging the reproducing function operating switch 414 shown in FIG. 27 to permit further reduction in size of the video camera.

The fifth embodiment is arranged, as described above, to make the display image plane of the display part 407 of the video camera larger and to make an image display in a manner suited for the operating condition of the video camera. The arrangement enables the operator to adequately view an image on display, improves the operability of the video camera and permits reduction in size thereof.

The invention claimed is:

1. An image pickup apparatus having an approximately rectangular parallelepiped shape extending longer in a height direction of a body thereof in an image pickup state, said image pickup apparatus comprising:

a display part of an approximately rectangular shape disposed on a side face of the image pickup apparatus body and having a display plane to display a picked-up image; and a moving member for enabling said display part to move between a first position in which said display part makes the picked-up image viewable and a second position in which said display part is stowed in the image pickup apparatus body, wherein, when said display part is in the second position, an image pickup optical axis of the image pickup apparatus body is approximately parallel with said display plane and a major-side direction of said display plane coincides with a major-side direction of the image pickup apparatus body, and when said display part is in the first position, a minor-side direction of said display plane coincides with the major-side direction of the image pickup apparatus body.

2. An image pickup apparatus according to claim 1, wherein, when said display part is in the first position, an image pickup optical axis of the image pickup apparatus body is approximately perpendicular to the display plane of said display part.

3. An image pickup apparatus according to claim 1, wherein, when said display part is in the first position, an image pickup optical axis of the image pickup apparatus body is approximately perpendicular with the display plane of said display part.

4. An image pickup apparatus according to claim 1, wherein a length of said display part in the direction parallel with a minor-side direction of said display plane is approximately equal to a length in a minor-side direction of the image pickup apparatus body.

5. An image pickup apparatus according to claim 1, further comprising:

a sound output device which outputs a sound in company with display of a reproduced image at said display part, wherein said sound output device is disposed at a lower portion of the side face of said image pickup apparatus body on which said display part is connected to the image pickup apparatus body, and is arranged to be exposed outside when said display part is in the first position and to be covered by said display part when said display part is in the second position.

6. An image pickup apparatus according to claim 1, further comprising:

a sound-volume adjusting device which adjusts volume of a sound outputted in company with display of a reproduced image at said display part, wherein said sound-volume adjusting device is disposed at a lower portion of the side face of said image pickup apparatus body on which said display part is connected to the image pickup apparatus body, and is arranged to be exposed outside when said display part is in the first position and to be covered by said display part when said display part is in the second position.

7. An image pickup apparatus according to claim 1, further comprising:

an operation device operable for displaying a reproduced image at said display part, wherein said operation device is disposed at a lower portion of the side face of said image pickup apparatus body on which said display part is connected to the image pickup apparatus body, and is arranged to be exposed outside when said display part is in the first position and to be covered by said display part when said display part is in the second position.

8. An image pickup apparatus according to claim 1, wherein said moving member is connected to a minor side of said display part at a position which deviates from a center line of the minor side of said display part.

9. An image pickup apparatus having approximately rectangular parallelepiped shape extending longer in a height direction of a body thereof in an image pickup state, said image pickup apparatus comprising:

a display part of an approximately rectangular shape disposed on a side face of the image pickup apparatus body to display a picked-up image, the side face of the image pickup apparatus body is approximately parallel with an image pickup optical axis of the image pickup apparatus body;

a first member for enabling said display part to rotate around a first shaft approximately parallel with an incident optical axis from a state where a major-side direction of said display part is situated approximately parallel with a major-side direction of the image pickup apparatus body; and a second member for enabling said display part to rotate around a second shaft perpendicular to the incident optical axis in such a state that said display part has rotated approximately 90 degrees from the state where the major-side direction of said display part is situated approximately parallel with the major-side direction of the image pickup apparatus body.

10. An image pickup apparatus according to claim 9, wherein said second member includes:

a rotating member disposed at a central portion of a side face along a minor side of said display part; and a sliding member fixed to the image pickup apparatus body and arranged to slide along a guide member of the side face of said display part.

11. An image pickup apparatus according to claim 10, wherein said display part is made rotatable when said rotating member and said sliding member fittingly engage with each other.

12. An image pickup apparatus according to claim 9, further comprising:

a detection device which detects the state where the major-side direction of said display part is situated approximately parallel with the major-side direction the image pickup apparatus body; and a control circuit which causes said display part to display an image with a minor-side direction of said display part put on a horizontal plane, when the state where the major-side direction of said display part is situated approximately parallel with the major-side direction the image pickup apparatus body is detected by said detection device.

13. An image pickup apparatus comprising:

a display part disposed on a side face of the image pickup apparatus body and having a display plane to display a picked-up image; and a moving member for enabling said display part to move between a first position in which said display part makes the picked-up image viewable and a second position in which said display part is stowed in the image pickup apparatus body, wherein, said moving member comprises a first member for enabling said display part to rotate around a first shaft from a state where said display part is in the first position, and a second member for enabling said display part to rotate around a second shaft different from said first shaft in such a state that said display part has rotated from the state where said display part is in the first position, when said display part is in the second position, an image pickup optical axis of the image pickup apparatus body is approximately parallel with said display plane and a minor-side direction of said display plane, and when said display part is in the first position, said image pickup optical axis of the image pickup apparatus body is approximately perpendicular with said display plane, and wherein said first shaft is approximately parallel with an incident optical axis and said second shaft is approximately perpendicular to the incident optical axis.

14. An image pickup apparatus including a lens portion for converging an object image comprising:

a display part including a display face for displaying a picked-up image, wherein said display part is surrounded by a first side, second side, third side, and fourth side, wherein said first side and said second side face each other, and said third side and said fourth side face each other, wherein a length between said first side and said second side is longer than a length between said third side and said fourth side, wherein said first side and said second side is shorter than said third side and said fourth side;

a body including a first face, said first face is surrounded by a fifth side, sixth side, seventh side and eighth side, wherein said fifth side and said sixth side face each other, and said seventh side and said eighth side face each other, wherein a length between said fifth side and said sixth side is longer than a length between said seventh side and said eighth side, wherein said fifth side and said sixth side is shorter than said seventh side and said eighth side; and a moving member for moving said display part to a first position in which a back side of said display part faces the object and said display face of said display part faces an operator who uses said image pickup apparatus while said operator is picking up an image of the object, and a second position in which said display part is stowed in the image pickup apparatus body;

wherein when said display part is in the first position, third direction of said display part substantially parallels second direction of said body, and when said display part is in the second position, first direction of said display part substantially parallels second direction of said body, wherein said first direction is a direction which goes to said second side from said first side, said second direction is a direction which goes to said sixth side from said fifth side, and said third direction is a direction which goes to said fourth side from said third side.

15. An image pickup apparatus according to claim 14, further comprising:

an operation member located on a second face of said body, wherein said operation member is used when picking up image, and said second face adjoins said first face and is exposed outside regardless of the position of said display part.

16. An image pickup apparatus according to claim 14, wherein said lens portion is located in a face which adjoins said first face and includes said seventh side.

17. An image pickup apparatus including a lens portion for converging an object image comprising:

a display part including a display face for displaying a picked-up image, wherein said display part is surrounded by a first side, second side, third side and fourth side, wherein said first side and said second side face each other, and said third side and said fourth side face each other, wherein a length between said first side and said second side is longer than a length between said third side and said fourth side, wherein said first side and said second side is shorter than said third side and said fourth side;

a body including a first operation face having a first operation member operated by an operator who uses said image pickup apparatus, said first operation face is surrounded by a fifth side, sixth side, seventh side and eighth side, wherein said fifth side and said sixth side face each other, and said seventh side and said eighth side face each other, wherein a length between said fifth side and said sixth side is longer than a length between said seventh side and said eighth side, wherein said fifth side and said sixth side is shorter than said seventh side and said eighth side; and a moving member for moving said display part to a first position in which a back side of said display part faces the object and said display face of said display part faces said operator while said operator is picking up an image of the object, and a second position in which said display part is stowed in the image pickup apparatus body;

wherein when said display part is in the first position, third direction of said display part substantially parallels second direction of said body, and when said display part is in the second position, first direction of said display part substantially parallels second direction of said body, wherein said first direction is a direction which goes to said second side from said first side, said second direction is a direction which goes to said sixth side from said fifth side, and said third direction is a direction which goes to said fourth side from said third side.

18. An image pickup apparatus according to claim 17, further comprising:

a second operation member located on a second operation face of said body, wherein said second operation member is used when picking up image, and said second operation face adjoins said first operation face and is exposed outside regardless of the position of said display part.

19. An image pickup apparatus according to claim 17, wherein said lens portion is located in a face which adjoins said first face and includes said seventh side.

20. An image pickup apparatus including a lens portion for converging an object image comprising:

a display part including a display face for displaying a picked-up image;

a body including a first operation face having a first operation member operated by an operator who uses said image pickup apparatus; and a moving member for moving said display part to a first position in which a back side of said display part faces the object and said display face of said display part faces said operator while said operator is picking up an image of the object, and a second position in which said display part is stowed in the image pickup apparatus body;

wherein when said display part is in the second position, a major-side direction of said display part substantially parallels a major-side direction of said body, and when said display part is in the first position, a minor-side direction of said display part substantially parallels a major-side direction of said body.

21. An image pickup apparatus according to claim 20, further comprising:
a second operation member located on a second operation face of said body, wherein said second operation member is used when picking up image, and said second operation face adjoins said first operation face and is exposed outside regardless of the position of said display part.

22. An image pickup apparatus including a lens portion for converging an object image comprising:
a display part including a display face for displaying a picked-up image;
a body including a first face; and
a moving member for moving said display part to a first position in which a back side of said display part faces the object and said display face of said display part faces an operator who uses said image pickup apparatus while said operator is picking up an image of the object, and a second position in which said display part is stowed in the image pickup apparatus body;
wherein when said display part is in the second position, a major-side direction of said display part substantially parallels a major-side direction of said body, and when said display part is in the first position, a minor-side direction of said display part substantially parallels a major-side direction of said body.

23. An image pickup apparatus according to claim 22, further comprising:
an operation member located on a second face of said body, wherein said operation member is used when picking up image, and said second face adjoins said first face and is exposed outside regardless of the position of said display part.

24. An image pickup apparatus including a lens portion for converging an object image comprising:
a display part including a display face for displaying a picked-up image;
a body including a first operation face having a first operation member operated by an operator who uses said image pickup apparatus; and
a moving member for moving said display part to a first position in which said operator can view said display face of said display part and a second position in which said display part is stowed in the image pickup apparatus;
wherein said operator rotates said display part around a first shaft from said second position toward an upper side of said image pickup apparatus so that said display part moves from said second position to a third position and, said operator rotates said display part around a second shaft approximately perpendicular to said first shaft from said third position so that said display part moves from said third position to said first position;
wherein when said display part is in the second position, a major-side direction of said display part substantially parallels a major-side direction of said body, and when said display part is in the first position, a minor-side direction of said display part substantially parallels a major-side direction of said body.

25. An image pickup apparatus according to claim 24, further comprising:
an operation member located on a second face of said body, wherein said operation member is used when picking up image, and said second face adjoins said first face and is exposed outside regardless of the position of said display part.

26. An image pickup apparatus according to claim 24, wherein said lens portion is located in a face which adjoins said first face and includes said seventh side.

27. An image pickup apparatus including a lens portion for converging an object image comprising:
a display part including a display face for displaying a picked-up image;
a body including a first face; and
a moving member for moving said display part to a first position in which an operator who uses said image pickup apparatus can view said display face of said display part and a second position in which said display part is stowed in the image pickup apparatus;
wherein said operator rotates said display part around a first shaft from said second position toward an upper side of said image pickup apparatus so that said display part moves from said second position to a third position and, said operator rotates said display part around a second shaft approximately perpendicular to said first shaft from said third position so that said display part moves from said third position to said first position;
wherein when said display part is in the second position, a major-side direction of said display part substantially parallels a major-side direction of said body, and when said display part is in the first position, a minor-side direction of said display part substantially parallels a major-side direction of said body.

28. An image pickup apparatus according to claim 27, further comprising:
an operation member located on a second face of said body, wherein said operation member is used when picking up image, and said second face adjoins said first face and is exposed outside regardless of the position of said display part.

29. An image pickup apparatus according to claim 27, wherein said lens portion is located in a face which adjoins said first face and includes said seventh side.

30. An image pickup apparatus including a lens portion for converging an object image comprising:
a display part including a display face for displaying a picked-up image, wherein said display part is surrounded by a first side, second side, third side, and fourth side, wherein said first side and said second side face each other, and said third side and said fourth side face each other, wherein a length between said first side and said second side is longer than a length between said third side and said fourth side, wherein said first side and said second side is shorter than said third side and said fourth side;
a body including a first face, said first face is surrounded by a fifth side, sixth side, seventh side and eighth side, wherein said fifth side and said sixth side face each other, and said seventh side and said eighth side face each other, wherein a length between said fifth side and said sixth side is longer than a length between said seventh side and said eighth side, wherein said fifth side and said sixth side is shorter than said seventh side and said eighth side; and
a moving member for moving said display part to a first position in which an operator who uses said image pickup apparatus can view said display face of said display part and a second position in which said display part is stowed in the image pickup apparatus;

wherein said operator rotates said display part around a first shaft from said second position toward an upper side of said image pickup apparatus so that said display part moves from said second position to a third position and, said operator rotates said display part around a second shaft approximately perpendicular to said first shaft from said third position so that said display part moves from said third position to said first position;

wherein when said display part is in the first position, third direction of said display part substantially parallels second direction of said body, and when said display part is in the second position, first direction of said display part substantially parallels second direction of said body, wherein said first direction is a direction which goes to said second side from said first side, said second direction is a direction which goes to said sixth side from said fifth side, and said third direction is a direction which goes to said fourth side from said third side.

31. An image pickup apparatus according to claim 30, further comprising:

an operation member located on a second face of said body, wherein said operation member is used when picking up image, and said second face adjoins said first face and is exposed outside regardless of the position of said display part.

32. An image pickup apparatus according to claim 30, wherein said lens portion is located in a face which adjoins said first face and includes said seventh side.

33. An image pickup apparatus including a lens portion for converging an object image comprising:

a display part including a display face for displaying a picked-up image, wherein said display part is surrounded by a first side, second side, third side and fourth side, wherein said first side and said second side face each other, and said third side and said fourth side face each other, wherein a length between said first side and said second side is longer than a length between said third side and said fourth side, wherein said first side and said second side is shorter than said third side and said fourth side;

a body including a first operation face having a first operation member operated by an operator who uses said image pickup apparatus, said first operation face is surrounded by a fifth side, sixth side, seventh side and eighth side, wherein said fifth side and said sixth side face each other, and said seventh side and said eighth side face each other, wherein a length between said fifth side and said sixth side is longer than a length between said seventh side and said eighth side, wherein said fifth side and said sixth side is shorter than said seventh side and said eighth side; and a moving member for moving said display part to a first position in which said operator can view said display face of said display part and a second position in which said display part is stowed in the image pickup apparatus;

wherein said operator rotates said display part around a first shaft from said second position toward an upper side of said image pickup apparatus so that said display part moves from said second position to a third position and, said operator rotates said display part around a second shaft approximately perpendicular to said first shaft from said third position so that said display part moves from said third position to said first position;

wherein when said display part is in the first position, third direction of said display part substantially parallels second direction of said body, and when said display part is in the second position, first direction of said display part substantially parallels second direction of said body, wherein said first direction is a direction which goes to said second side from said first side, said second direction is a direction which goes to said sixth side from said fifth side, and said third direction is a direction which goes to said fourth side from said third side.

34. An image pickup apparatus according to claim 33, further comprising:

an operation member located on a second face of said body, wherein said operation member is used when picking up image, and said second face adjoins said first face and is exposed outside regardless of the position of said display part.

35. An image pickup apparatus according to claim 33, wherein said lens portion is located in a face which adjoins said first face and includes said seventh side.

* * * * *